United States Patent
Park et al.

(10) Patent No.: US 11,657,425 B2
(45) Date of Patent: May 23, 2023

(54) TARGET USER ESTIMATION FOR DYNAMIC ASSETS

(71) Applicant: Oracle International Corporation, Redwood Shores, CA (US)

(72) Inventors: Hoyong Park, San Jose, CA (US); Sandeep Bishnoi, Mill Valley, CA (US); Prabhu Thukkaram, San Ramon, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 302 days.

(21) Appl. No.: 16/022,005

(22) Filed: Jun. 28, 2018

(65) Prior Publication Data

US 2019/0102791 A1 Apr. 4, 2019

Related U.S. Application Data

(60) Provisional application No. 62/565,597, filed on Sep. 29, 2017.

(51) Int. Cl.
  *G06Q 30/0251* (2023.01)
  *G06F 16/2452* (2019.01)
(52) U.S. Cl.
  CPC ... *G06Q 30/0251* (2013.01); *G06F 16/24522* (2019.01)
(58) Field of Classification Search
  None
  See application file for complete search history.

(56) References Cited

U.S. PATENT DOCUMENTS

| | | | |
|---|---|---|---|
| 8,606,630 B2 | 12/2013 | Fordyce, III et al. | |
| 8,978,034 B1* | 3/2015 | Goodson | G06F 16/21 718/101 |
| 9,774,696 B1* | 9/2017 | Calvert | H04L 51/20 |
| 10,552,871 B1* | 2/2020 | Chadwick | G06Q 30/0269 |
| 10,891,269 B2* | 1/2021 | Shimanovsky | G06F 16/23 |

(Continued)

OTHER PUBLICATIONS

"Managing Complex Augmented Reality Models" Dieter Schmalstieg, Jul./Aug. 2007 (Year: 2007).*

*Primary Examiner* — Victoria E. Frunzi
(74) *Attorney, Agent, or Firm* — Kilpatrick Townsend & Stockton LLP

(57) ABSTRACT

Techniques for processing event streams are provided that use streaming analytics to estimate a target user for dynamic assets. An exemplary technique includes receiving a batch of events that have position data for a potential target, determining one or more polygons that comprise the potential target based on the position data for the potential target, determining an approximate target viewership for the one or more polygons based on a profile or taxonomy of the potential target, associating an advertisement with the one or more polygons based on the approximate target viewership, receiving a continuous stream of events that have position data for a dynamic asset, determining that the one or more polygons include the dynamic asset based on the position data for the dynamic asset, obtaining the advertisement associated with the one or more polygons, and providing the advertisement to a sink for display on the dynamic asset.

14 Claims, 9 Drawing Sheets

(56) References Cited

U.S. PATENT DOCUMENTS

| | | | |
|---|---|---|---|
| 2005/0154638 A1* | 7/2005 | Altaf | G06Q 30/0251 |
| | | | 705/14.49 |
| 2008/0172274 A1 | 7/2008 | Hurowitz et al. | |
| 2008/0301135 A1* | 12/2008 | Alves | G06F 16/2453 |
| 2014/0040016 A1* | 2/2014 | Amla | G06Q 30/0267 |
| | | | 705/14.45 |
| 2016/0224624 A1* | 8/2016 | Robichaud | G06F 16/24532 |
| 2016/0300144 A1* | 10/2016 | Santhanam | G06N 20/00 |

\* cited by examiner

| Polygons | Time Range | Potential Targets | Time | Enrichment Profile and Taxonomy | Predominant or Amalgamate Profile and Taxonomy | Matching Ads |
|---|---|---|---|---|---|---|
| Polygon 101 | | | | | | |
| Instance 1 | 12 AM - 6 AM | 5550123 | 240000 | Teenager; Swimmer; | Teenager; Sports | Ad 1: Ticket sales for ball game tonight |
| | | | | | | Ad 2: Sporting goods store |
| | | | | | | Ad 3: Ticket sales for upcoming sporting event at local college |
| Instance 2 | 6 AM-12 PM | 5550001 | 113352 | Senior Citizen; On a Cruise | Senior Citizen; Traveling | Ad 1: Popular tourist attraction |
| | | | | | | Ad 2: Hotel |
| Instance 3 | 12 PM - 6 PM | 5556162 | 142840 | Middle-Age Adult; New Home Owner | Middle-Age Adult; General Shopping | Ad 1: Home shopping |
| | | 5554679 | 155130 | Middle-Age Adult; Tourist from Europe | | Ad 2: Local Mall |
| | | 5550113 | 154712 | Senor Citizen; Military | | Ad 3: Local Restaurant |
| Instance 4 | 6 PM - 12 AM | 5553226 | 235317 | Teenager; Baseball; | Teenager; Sports | Ad 1: Ticket sales for ball game tonight |
| | | 5552368 | 204511 | Teenager; Video Games; | | Ad 2: Sporting goods store |
| | | 5550100 | 221318 | Teenager; Horses | | Ad 3: Ticket sales for upcoming sporting event at local college |
| | | 5559175 | 183216 | Yound Adult; Football; Hockey | | Ad 4: Video Game store |
| | | 5550840 | 193007 | Young Adult; Traveling | | |
| Polygon 102 | | | | | | |
| Instance 1 | 12 AM -6 AM | | | | | |
| Instance 2 | 6 AM-12 PM | 5555684 | 075616 | Senior Citizen; Military | Senior Citizen; Military; Retired | Ad 1: Home shopping |
| | | 5558889 | 101313 | Senior Citizen; Military | | Ad 2: Local Restaurant |
| | | | | | | Ad 3: Tickets for local museum |
| Instance 3 | 12 PM - 6 PM | 5556234 | 132645 | Young Adult; College Student | Young Adult; Secondary Education | Ad 1: Tickets for concert at local college |
| | | 5558462 | 163021 | Teenager; Senior High School | | Ad 2: Local University |
| | | 5550031 | 162955 | Middle-Age Adult; Married | | Ad 3: On-campus Restaurant |
| Instance 4 | 6 PM - 12 AM | 5554217 | 183201 | Young Adult; On a Cruise | Young Adult; Traveling | Ad 1: Hotel |
| | | 5556636 | 194523 | Young Adult; On a Cruise | | Ad 2: Popular Beach Destination for YA |
| | | 5556087 | 211136 | Teenager; Baseball; | | Ad 3: Popular Abroad Destination for YA |
| | | 5553477 | 211500 | Young Adult; Tourist | | |
| | | 5559091 | 213214 | Young Adult; Tourist | | |

FIG. 4

TARGET USER ESTIMATION FOR DYNAMIC ASSETS

CROSS REFERENCE TO RELATED APPLICATION

This application claims priority to U.S. Provisional Application No. 62/565,597 filed on Sep. 29, 2017, the entirety of which is incorporated herein by reference.

FIELD OF THE INVENTION

The present disclosure relates generally to complex event processing, and more particularly, to techniques for processing continuous data or event streams using streaming analytics to estimate a target user for dynamic assets.

BACKGROUND

In traditional database systems, data is stored in one or more databases usually in the form of tables. The stored data is then queried and manipulated using a data management language such as a structured query language (SQL). For example, a SQL query may be defined and executed to identify relevant data from the data stored in the database. A SQL query is thus executed on a finite set of data stored in the database. Further, when a SQL query is executed, it is executed once on the finite data set and produces a finite static result. Databases are thus best equipped to run queries over finite stored data sets.

A number of modern applications and systems however generate data in the form of continuous data or event streams instead of a finite data set. Examples of such applications include but are not limited to sensor data applications, financial tickers, network performance measuring tools (e.g. network monitoring and traffic management applications), clickstream analysis tools, automobile traffic monitoring, and the like. Such applications have given rise to a need for a new breed of applications that can process the data streams. For example, a temperature sensor may be configured to send out temperature readings in a continuous manner and hardware components or software applications need to be able to process (e.g., query) the continuous and ever changing stream of data.

Managing and processing data for these types of event stream-based applications involves building data management and querying capabilities with a strong temporal focus. A different kind of querying mechanism is needed that comprises long-running queries over continuous unbounded sets of data. While some vendors now offer product suites geared towards event streams processing, these product offerings still lack the processing flexibility required for handling today's event processing needs. Accordingly, new techniques are desired for processing continuous data or event streams.

BRIEF SUMMARY

Techniques are provided (e.g., a method, a system, non-transitory computer-readable medium storing code or instructions executable by one or more processors) for processing events of an event stream. In various embodiments, a method is provided for that comprises receiving, at the data processing system, a batch of events, where each event within the batch of events comprises position data for a potential target; determining, by a first application of the data processing system, one or more polygons that comprise the potential target based on the position data for the potential target, where the one or more polygons are part of a grid of polygons overlaid on a geographic map that define an artificial boundary for the geographic map; determining, by the first application, an approximate target viewership for the one or more polygons based on a profile or taxonomy of the potential target; associating, by the first application, an advertisement with the one or more polygons based on the approximate target viewership; receiving, at the data processing system, a continuous stream of events, where each event in the continuous stream comprises position data for a dynamic asset; determining, by a second application, that the one or more polygons comprise the dynamic asset based on the position data for the dynamic asset; obtaining, by the second application, the advertisement associated with the one or more polygons; and providing, by the second application, the advertisement to a sink for display on the dynamic asset.

In some embodiments, the determining the approximate target viewership for the one or more polygons comprises: (i) identifying, by the first application, all potential targets associated with the one or more polygons including the potential target; (ii) analyzing, by the first application, the profile or taxonomy for each of the potential targets to determine different groups of potential targets within the one or more polygons; and (iii) performing statistical analysis, by the first application, on the different groups of potential targets to determine a predominant or amalgamate profile or taxonomy for the approximate target viewership.

In some embodiments, the method further comprises obtaining, by the first application, the profile or taxonomy data for the potential target from a third party source; and obtaining, by the first application, a plurality of advertisements from the third party source, where each of the plurality of advertisements comprise profile or taxonomy data. The associating the advertisement with the one or more polygons may comprise: (i) matching the predominant or amalgamate profile or taxonomy for the approximate target viewership with profile or taxonomy data of one or more of the plurality of advertisements; and (ii) associating each of the one or more of the plurality of advertisements with the one or more polygons based on the matching.

Optionally, the obtaining the advertisement comprises obtaining, by the second application, each of the one or more of the plurality of advertisements associated with the one or more polygons; and the advertisement to be provided to the sink is selected from the one or more of the plurality of advertisements based on one or more business rules.

In some embodiments, each event within the batch of events comprises the position data and temporal data for the potential target; the determining that the one or more polygons comprise the potential target comprises determining, by the first application, an instance of the one or more polygons that comprises the potential target based on the position data and the temporal data for the potential target; the approximate target viewership is determined for the instance of the one or more polygons; and the advertisement is associated with the instance of the one or more polygons based on the approximate target viewership.

In some embodiments, each event in the continuous stream comprises the position data and temporal data for the dynamic asset; the determining that the one or more polygons comprise the dynamic asset comprises determining, by the second application, an instance of the one or more polygons that comprises the dynamic asset based on the position data and the temporal data for the dynamic asset;

and the advertisement obtained is associated with the instance of the one or more polygons.

In some embodiments, the determining the approximate target viewership for the instance of the one or more polygons comprises: (i) identifying, by the first application, all potential targets associated with the instance of the one or more polygons including the potential target; (ii) analyzing, by the first application, the profile or taxonomy for each of the potential targets to determine different groups of potential targets within the instance of the one or more polygons; and (iii) performing statistical analysis, by the first application, on the different groups of potential targets to determine a predominant or amalgamate profile or taxonomy for the approximate target viewership.

In some embodiments, the method further comprises obtaining, by the first application, the profile or taxonomy data for the potential target from a third party source; and obtaining, by the first application, a plurality of advertisements from the third party source, where each of the plurality of advertisements comprise profile or taxonomy data. The associating the advertisement with the instance of the one or more polygons comprises: (i) matching the predominant or amalgamate profile or taxonomy for the approximate target viewership with profile or taxonomy data of one or more of the plurality of advertisements; and (ii) associating each of the one or more of the plurality of advertisements with the instance of the one or more polygons based on the matching.

Optionally, the obtaining the advertisement comprises obtaining, by the second application, each of the one or more of the plurality of advertisements associated with the instance of the one or more polygons. Optionally, the advertisement to be provided to the sink is selected from the one or more of the plurality of advertisements based on one or more business rules.

In various embodiments, s system is provided for comprising a data processing system that includes one or more processors and non-transitory machine readable storage medium having instructions stored thereon that when executed by the one or more processors cause the one or more processors to perform the process comprising: receiving, at the data processing system, a batch of events, where each event within the batch of events comprises position data for a potential target; determining, by the one or more processors, one or more polygons that comprise the potential target based on the position data for the potential target, where the one or more polygons are part of a grid of polygons overlaid on a geographic map that define an artificial boundary for the geographic map; determining, by the one or more processors, an approximate target viewership for the one or more polygons based on a profile or taxonomy of the potential target; associating, by the one or more processors, an advertisement with the one or more polygons based on the approximate target viewership; receiving, at the data processing system, a continuous stream of events, where each event in the continuous stream comprises position data for a dynamic asset; determining, by the one or more processors, that the one or more polygons comprise the dynamic asset based on the position data for the dynamic asset; obtaining, by the one or more processors, the advertisement associated with the one or more polygons; and providing, by the one or more processors, the advertisement to a sink for display on the dynamic asset.

In some embodiments, the potential target is a potential customer of a product or service to be displayed in the advertisement associated with the one or more polygons, and the dynamic asset is moving such that the position data for the dynamic asset changes over time.

In some embodiments, the determining the approximate target viewership for the one or more polygons comprises: identifying, by the one or more processors, all potential targets associated with the one or more polygons including the potential target; analyzing, by the one or more processors, the profile or taxonomy for each of the potential targets to determine different groups of potential targets within the one or more polygons; and performing statistical analysis, by the one or more processors, on the different groups of potential targets to determine a predominant or amalgamate profile or taxonomy for the approximate target viewership.

In some embodiments, the process further comprises: obtaining, by the one or more processors, the profile or taxonomy data for the potential target from a third party source; and obtaining, by the one or more processors, a plurality of advertisements from the third party source, where each of the plurality of advertisements comprise profile or taxonomy data. Optionally, the associating the advertisement with the one or more polygons comprises: (i) matching the predominant or amalgamate profile or taxonomy for the approximate target viewership with profile or taxonomy data of one or more of the plurality of advertisements; and associating each of the one or more of the plurality of advertisements with the one or more polygons based on the matching.

In some embodiments, the obtaining the advertisement comprises obtaining, by the one or more processors, each of the one or more of the plurality of advertisements associated with the one or more polygons. Optionally, the advertisement to be provided to the sink is selected from the one or more of the plurality of advertisements based on one or more business rules.

In various embodiments, a non-transitory machine readable storage medium is provided having instructions stored thereon that when executed by one or more processors cause the one or more processors to perform the method comprising: receiving a batch of events, where each event within the batch of events comprises position data for a potential target; determining one or more polygons that comprise the potential target based on the position data for the potential target, where the one or more polygons are part of a grid of polygons overlaid on a geographic map that define an artificial boundary for the geographic map; determining an approximate target viewership for the one or more polygons based on a profile or taxonomy of the potential target; associating an advertisement with the one or more polygons based on the approximate target viewership; receiving a continuous stream of events, where each event in the continuous stream comprises position data for a dynamic asset; determining that the one or more polygons comprise the dynamic asset based on the position data for the dynamic asset; obtaining the advertisement associated with the one or more polygons; and providing the advertisement to a sink for display on the dynamic asset.

In some embodiments, the potential target is a potential customer of a product or service to be displayed in the advertisement associated with the one or more polygons, and the dynamic asset is moving such that the position data for the dynamic asset changes over time.

In some embodiments, the determining the approximate target viewership for the one or more polygons comprises: (i) identifying all potential targets associated with the one or more polygons including the potential target; (ii) analyzing the profile or taxonomy for each of the potential targets to determine different groups of potential targets within the one or more polygons; and (iii) performing statistical analysis on the different groups of potential targets to determine a predominant or amalgamate profile or taxonomy for the approximate target viewership.

In some embodiments, the method further comprises: obtaining the profile or taxonomy data for the potential target from a third party source; and obtaining a plurality of advertisements from the third party source, where each of the plurality of advertisements comprise profile or taxonomy data. Optionally, the associating the advertisement with the one or more polygons comprises: (i) matching the predominant or amalgamate profile or taxonomy for the approximate target viewership with profile or taxonomy data of one or more of the plurality of advertisements; and (ii) associating each of the one or more of the plurality of advertisements with the one or more polygons based on the matching.

In some embodiments, the obtaining the advertisement comprises obtaining each of the one or more of the plurality of advertisements associated with the one or more polygons; and the advertisement to be provided to the sink is selected from the one or more of the plurality of advertisements based on one or more business rules.

In some embodiments, each event within the batch of events comprises the position data and temporal data for the potential target; the determining that the one or more polygons comprise the potential target comprises determining an instance of the one or more polygons that comprises the potential target based on the position data and the temporal data for the potential target; the approximate target viewership is determined for the instance of the one or more polygons; the advertisement is associated with the instance of the one or more polygons based on the approximate target viewership; each event in the continuous stream comprises the position data and temporal data for the dynamic asset; the determining that the one or more polygons comprise the dynamic asset comprises determining an instance of the one or more polygons that comprises the dynamic asset based on the position data and the temporal data for the dynamic asset; and the advertisement obtained is associated with the instance of the one or more polygons.

The techniques described above and below may be implemented in a number of ways and in a number of contexts. Several example implementations and contexts are provided with reference to the following figures, as described below in more detail. However, the following implementations and contexts are but a few of many.

BRIEF DESCRIPTION OF THE DRAWINGS

FIG. 4 depicts output of instances of one or more polygons with the associated advertisements in table format in accordance with various embodiments.

DETAILED DESCRIPTION

Figure 1:
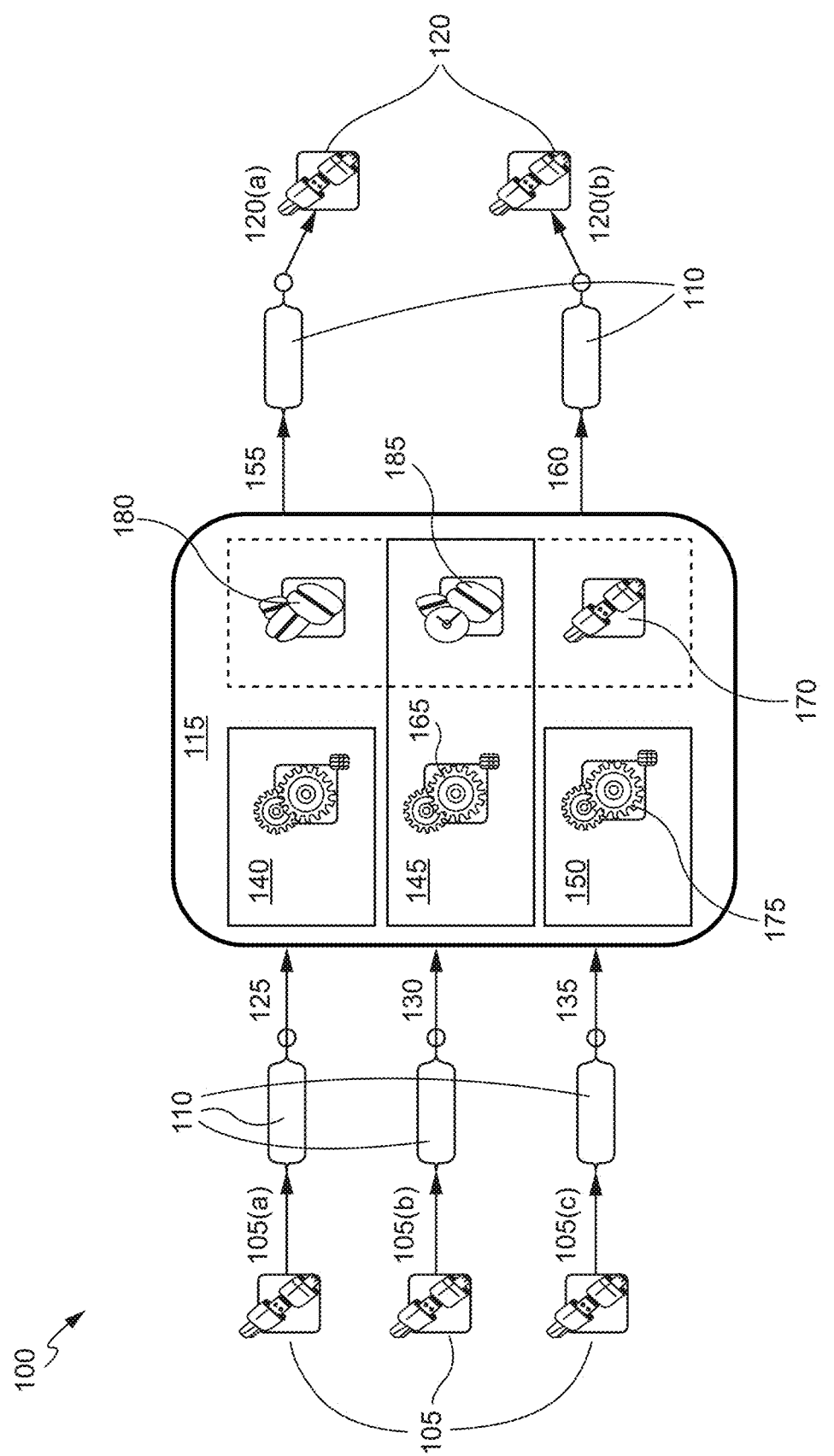
FIG. 1 is an illustration of a stream analytics system in which techniques for receiving and processing data streaming from an event source may be implemented in accordance with various embodiments.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Overview of Complex Event Processing (CEP)

Complex Event Processing (CEP) provides a modular platform for building applications based on an event-driven architecture. At the heart of the CEP platform is the Continuous Query Language (CQL), which allows applications to filter, query, and perform pattern matching operations on streams of data using a declarative, SQL-like language. Developers may use CQL in conjunction with a lightweight Java programming model to write applications. Other platform modules include a feature-rich IDE, management console, clustering, distributed caching, event repository, and monitoring, to name a few.

As event-driven architecture and complex event processing have become prominent features of the enterprise computing landscape, more and more enterprises have begun to build mission-critical applications using CEP technology. Today, mission-critical CEP applications can be found in many different industries. For example, CEP technology is being used in the power industry to make utilities more efficient by allowing them to react instantaneously to changes in demand for electricity. CEP technology is being used in the credit card industry to detect potentially fraudulent transactions as they occur in real time. The list of mission-critical CEP applications continues to grow. The use of CEP technology to build mission-critical applications has led to a need for CEP applications to be made highly available and fault-tolerant.

Today's Information Technology (IT) environments generate continuous streams of data for everything from monitoring financial markets and network performance, to business process execution and tracking RFID tagged assets. CEP provides a rich, declarative environment for developing event processing applications to improve the effectiveness of business operations. CEP can process multiple event streams to detect patterns and trends in real time and provide enterprises the necessary visibility to capitalize on emerging opportunities or mitigate developing risks.

A continuous stream of data (also referred to as an event stream) may include a stream of data or events that may be continuous or unbounded in nature with no explicit end. Logically, an event or data stream may be a sequence of data elements (also referred to as events), each data element having an associated timestamp. A continuous event stream may be logically represented as a bag or set of elements (s, T), where "s" represents the data portion, and "T" is in the time domain. The "s" portion is generally referred to as a tuple or event. An event stream may thus be a sequence of time-stamped tuples or events.

In some aspects, the timestamps associated with events in a stream may equate to a clock time. In other examples, however, the time associated with events in an event stream may be defined by the application domain and may not correspond to clock time but may, for example, be represented by sequence numbers instead. Accordingly, the time information associated with an event in an event stream may be represented by a number, a timestamp, or any other information that represents a notion of time. For a system receiving an input event stream, the events arrive at the system in the order of increasing timestamps. There could be more than one event with the same timestamp.

In some examples, an event in an event stream may represent an occurrence of some worldly event (e.g., when a temperature sensor changed value to a new value, when the price of a stock symbol changed) and the time information associated with the event may indicate when the worldly event represented by the data stream event occurred.

For events received via an event stream, the time information associated with an event may be used to ensure that the events in the event stream arrive in the order of increasing timestamp values. This may enable events received in the event stream to be ordered based upon their associated time information. In order to enable this ordering, timestamps may be associated with events in an event stream in a non-decreasing manner such that a later-generated event has a later timestamp than an earlier-generated event. As another example, if sequence numbers are being used as time information, then the sequence number associated with a later-generated event may be greater than the sequence number associated with an earlier-generated event. In some examples, multiple events may be associated with the same timestamp or sequence number, for example, when the worldly events represented by the data stream events occur at the same time. Events belonging to the same event stream may generally be processed in the order imposed on the events by the associated time information, with earlier events being processed prior to later events.

The time information (e.g., timestamps) associated with an event in an event stream may be set by the source of the stream or alternatively may be set by the system receiving the stream. For example, in certain embodiments, a heartbeat may be maintained on a system receiving an event stream, and the time associated with an event may be based upon a time of arrival of the event at the system as measured by the heartbeat. It is possible for two events in an event stream to have the same time information. It is to be noted that while timestamp ordering requirement is specific to one event stream, events of different streams could be arbitrarily interleaved.

An event stream has an associated schema "S," the schema comprising time information and a set of one or more named attributes. All events that belong to a particular event stream conform to the schema associated with that particular event stream. Accordingly, for an event stream (s, T), the event stream may have a schema 'S' as (<time_stamp>, <attribute(s)>), where <attributes> represents the data portion of the schema and can comprise one or more attributes. For example, the schema for a stock ticker event stream may comprise attributes <stock symbol> and <stock price>. Each event received via such a stream will have a time stamp and the two attributes. For example, the stock ticker event stream may receive the following events and associated timestamps:

. . .
(<timestamp_N>, <NVDA,4>)
(<timestamp_N+1>, <ORCL,62>)
(<timestamp_N+2>, <PCAR,38>)
(<timestamp_N+3>, <SPOT,53>)
(<timestamp_N+4>, <PDCO,44>)
(<timestamp_N+5>, <PTEN,50>)
. . .

In the above stream, for stream element (<timestamp_N+1>, <ORCL,62>), the event is <ORCL,62> with attributes "stock_symbol" and "stock_value." The timestamp associated with the stream element is "timestamp_N+1". A continuous event stream is thus a flow of events, each event having the same series of attributes.

As noted, a stream may be the principle source of data that CQL queries may act on. A stream S may be a bag (also referred to as a "multi-set") of elements (s, T), where "s" is in the schema of S and "T" is in the time domain. Additionally, stream elements may be tuple-timestamp pairs, which can be represented as a sequence of timestamped tuple insertions. In other words, a stream may be a sequence of timestamped tuples. In some cases, there may be more than one tuple with the same timestamp. And, the tuples of an input stream may be requested to arrive at the system in order of increasing timestamps. Alternatively, a relation (also referred to as a "time varying relation," and not to be confused with "relational data," which may include data from a relational database) may be a mapping from the time domain to an unbounded bag of tuples of the schema R. In some examples, a relation may be an unordered, time-varying bag of tuples (i.e., an instantaneous relation). In some cases, at each instance of time, a relation may be a bounded set. It can also be represented as a sequence of timestamped tuples that may include insertions, deletes, and/or updates to capture the changing state of the relation. Similar to streams, a relation may have a fixed schema to which each tuple of the relation may conform. Further, as used herein, a continuous query may generally be capable of processing data of (i.e., queried against) a stream and/or a relation. Additionally, the relation may reference data of the stream.

In some aspects, the CQL engine may include a full blown query language. As such, a user may specify computations in terms of a query. Additionally, the CQL engine may be designed for optimizing memory, utilizing query language features, operator sharing, rich pattern matching, rich language constructs, etc. Additionally, in some examples, the CQL engine may process both historical data and streaming data. For example, a user can set a query to send an alert when California sales hit above a certain target. Thus, in some examples, the alert may be based at least in part on historical sales data as well as incoming live (i.e., real-time) sales data.

In some examples, the CQL engine or other features of the below described concepts may be configured to combine a historical context (i.e., warehouse data) with incoming data in a real-time fashion. Thus, in some cases, the present disclosure may describe the boundary of database stored information and in-flight information. Both the database stored information and the inflight information may include business intelligence (BI) data. As such, the database may, in some examples, be a BI server or it may be any type of database. Further, in some examples, the features of the present disclosure may enable the implementation of the above features without users knowing how to program or otherwise write code. In other words, the features may be provided in a feature-rich user interface (UI) or other manner that allows non-developers to implement the combination of historical data with real-time data.

In some examples, the above concepts may be utilized to leverage the rich real-time and continuous event processing capabilities associated with complex event processing. Several features may be supported such as, but not limited to, archived relations. As such, in order to leverage such features (e.g., rich, real-time and continuous event processing), the system may be configured to transparently deal with startup state and runtime state of relational data. In other words, the system may be configured to manage a query that is non-empty at the instant of its creation (i.e., an archived relation).

In some examples, an archived relation may be utilized. As such, when a CQL engine sees a query that indicates that it is based on an archived relation, that archived relation may also indicate that there are certain entities it can call to query for historical context, for example. In some examples, a data definition language (DDL) may indicate annotations about the archived relation such as, but not limited to, how to perform the query, what are the important columns in the table, and/or where to send the rest of the data. In some examples, once the query is constructed in the CQL engine (e.g., as a graph), the system may analyze the query graph. Additionally, in some aspects, there are certain operators that are stateful, like "distinct," "group aggr," "pattern," and/or "group by." However, stateless operators may just take input and send it to the parent, for example, downstream operators. Thus, one approach is to store the entire table. However, utilizing archived relations, the system may analyze the query graph and decide which of the lowest stateful operators that it can use to query the archive. In some examples, the system (or one or more computer-implemented methods) may retrieve the state at the lowest stateful operator reached while traversing the graph. For example, the query graph may be analyzed in a topological order from the source. Based at least in part on this first stateful operator, the CQL engine may then determine the optimal amount of data to be fetched in order to initialize the state of the operators for a query defined over an archived relation.

In at least one non-limiting example, source operators like relation and/or source may come first in the topological traversal with query output and/or root coming last. For example, if the CQL query looks like: select sum(c1) from R1 where c2>c25, the plan for this query may look like: RelationSource→SELECT→GroupAggr. Thus, following the topological order, and since RelationSource and SELECT are both stateless, the lowest stateful operator may be GroupAggr. In this way, the stateful operators of a query (GroupAggr in this example) may enable the query engine to populate the query engine with historical data from a data store prior to receiving streaming data. This may be enabled based at least in part on the fact that the query is analyzing an archived relation and the archived relation has been indicated as such.

In some examples, a window size for a given archived relation may be specified by a user. A window, in some aspects, in relation to an archived relation, may include a node in a query graph that analyzes or otherwise evaluates incoming streamed content. In other words, the window may define the amount of streamed content to be analyzed and/or processed by the query engine and/or the amount of historical data that will be included in the archived relation.

At a high level, once a window is applied on a Stream it becomes a Relation and then regular relational logic may be applied, as with relational databases. As tuples arrive and leave the window, the Relation under consideration changes with queries compiled against it emitting results at the same time. CQL may support RANGE (up to nanoseconds granularity), ROWS, PARTITION BY and extensible windows. These windows are examples of stream-to-relation operators. On the other hand, ISTREAM (i.e., insert stream), DSTREAM (i.e., delete stream) and RSTREAM (i.e., relation stream) are relation-to-stream operators. In some examples, a user, developer, and/or manager may set the window size (e.g., via a UI) provided by the query engine or one or more computing systems operating or hosting the query engine. In some examples, a window on a stream may be a time-based range window. For example, a configurable value window on an archived relation may be specified using window size and the attribute on which the window is calculated. When there is a configurable value window specified on top of archived relation, a snapshot query may be computed and the snapshot tuples, which are within window limits, may be output. Additionally, after state initialization, the value window may be applied on incoming active data. In some examples, only the incoming active data will be inserted into window whose window attribute's value is differing from current event time for less than the window size.

Additionally, in some examples, features of the present disclosure may also leverage the continuous query processing capabilities of the CQL engine and/or CEP engine to support real-time data analysis. In some aspects, the CQL engine and/or CEP engine may have traditionally been a stream-oriented analysis engine; however, it may be enhanced to support stream-oriented data that is backed by a durable store (e.g., the archived relation described above). For example, the present disclosure describes features that may support the notion of a data object (DO) which is a durable store (database and/or table). Modifications made to a DO may cause change notifications to be broadcast to interested listeners creating, in effect, a data stream. This data stream may be consumed by the CQL engine and/or CEP engine in support of any running queries; however, the CQL engine and/or CEP engine may not have been designed to take into account the existing data in the DO backing store. For example, the CQL engine and/or CEP engine may request that the initial state of the query running in the CQL engine and/or CEP engine reflect the current state of the DO including all the data currently in the DO backing store. Once this query is so initialized, the CQL engine and/or CEP engine only need to concern itself with the stream of DO change notifications from that point on in traditional stream-oriented style.

In some aspects, the CQL engine and/or CEP engine may traditionally process streams or non-archived relations, so there may be no initial state. For example, a query may be loaded, where it may start running and listening for changes, etc. In some cases, if a user asks for sales by state, in a bar chart, and then somebody makes a new sale, the table may get updated and the user may expect to see a change in the graph, pushed out to them. However, if they close the dashboard and come back a week later and bring up some sales, the user may expect to have the sum of sales according to the table of summed sales data. In other words, the query may need to bring the query up to the state of the archive and then listen for active changes.

In some aspects, for example, the CQL engine may be pre-initialized with the archived data. Once initialized, the CQL engine may listen to a Java Messaging Service (JMS) or other messenger for change notifications (e.g., based at least in part on API calls for inserting, deleting, etc., data from the archive). Thus, services can listen and if the JMS publishes on the same topic that the listening service is listening on, it may receive the data. The services don't have to know who is publishing or whether they are, or not. The listening service can just listen, and if something happens, the listening service may hear it. In some examples, this is how persistence is decoupled, for instance, from its consumers. Additionally, in some examples, an alert engine may raise alerts based on what the alert engine hears, potentially, and further, a SQL engine, that may be listening in on process queries of relevance to the listener.

In some examples, a query may be started in CQL, SQL, and/or CEP engine and instructions may be configured to get the archive data (e.g., to prime the pump) and then start listening to these JMS messages. However, with numerous inserts, deletes, etc., this could include a large amount of information. Additionally, there could be a lag time before the message is heard by the listener and the listening may, in some examples, jump in, query the archive, come back, and start listening. Thus, there is a potential for missing and/or double counting an event.

Additionally, if the engine merely runs the query, while it's running the query things can go into JMS and be published where the engine wasn't listening. So, the engine may be configured to setup the listener first, run the archive query, and then come back and actually start pulling out of the queue, so that it doesn't miss anything. Thus, the JMS may queue things up and, if things back up it's okay while the engine is doing a query because it can catch up later and it doesn't have to worry about whether it's synchronous. If it's not here, listening, it won't miss it, it gets queued until the engine comes back, as long as it has its listener established.

Additionally, in some examples, a system column may be added to a user's data. This system column may be for indicating transaction IDs to attempt to handle the double counting and/or missing operation problem. However, in other examples, the system may provide or otherwise generate a transaction context table. Additionally, there may be two additional columns TRANSACTION_CID and TRANSACTION_TID. The context table may always be maintained by persistence service so as to know thread (context)wise of the last committed transaction ID. The transaction IDs may be guaranteed to be committed in ascending order for a thread (context). For example, when a server comes up, it may run the persistence service. Each one may allocate a set of context IDs and transaction IDs for determining whether data of the pre-initialized information includes all of the data that has passed through the JMS. Additionally, in some cases, multiple output servers may be utilized (in compliance with JTA and/or to implement high availability (HA), where each server may manage a single set of context/transaction tables that are completely separate from the other tables managed by the other servers.

In some embodiments, when a continuous (for example, a CQL) query is created or registered, it may undergo parsing and semantic analysis at the end of which a logical query plan is created. When the CQL query is started, for example, by issuing an "alter query <queryname> start" DDL, the logical query plan may be converted to a physical query plan. In one example, the physical query plan may be represented as a directed acyclic graph (DAG) of physical operators. Then, the physical operators may be converted into execution operators to arrive at the final query plan for that CQL query. The incoming events to the CQL engine reach the source operator(s) and eventually move downstream with operators in the way performing their processing on those events and producing appropriate output events.

Event Processing Applications

The quantity and speed of both raw infrastructure and business events is exponentially growing in IT environments. Whether it is streaming stock data for financial services, streaming satellite data for the military or real-time vehicle-location data for transportation and logistics businesses, companies in multiple industries must handle large volumes of complex data in real-time. In addition, the explosion of mobile devices and the ubiquity of high-speed connectivity adds to the explosion of mobile data. At the same time, demand for business process agility and execution has also grown. These two trends have put pressure on organizations to increase their capability to support event-driven architecture patterns of implementation. Real-time event processing requires both the infrastructure and the application development environment to execute on event processing requirements. These requirements often include the need to scale from everyday use cases to extremely high velocities of data and event throughput, potentially with latencies measured in microseconds rather than seconds of response time. In addition, event processing applications must often detect complex patterns in the flow of these events.

The Stream Analytics platform (e.g., the Oracle Stream Analytics (OSA)) targets a wealth of industries and functional areas. The following are some use cases:

Telecommunications: Ability to perform real-time call detail (CDR) record monitoring and distributed denial of service attack detection.

Financial Services: Ability to capitalize on arbitrage opportunities that exist in millisecond or microsecond windows. Ability to perform real-time risk analysis, monitoring and reporting of financial securities trading and calculate foreign exchange prices.

Transportation: Ability to create passenger alerts and detect baggage location in case of flight discrepancies due to local or destination-city weather, ground crew operations, airport security, etc.

Public Sector/Military: Ability to detect dispersed geographical enemy information, abstract it, and decipher high probability of enemy attack. Ability to alert the most appropriate resources to respond to an emergency.

Insurance: Ability to learn and to detect potentially fraudulent claims.

IT Systems: Ability to detect failed applications or servers in real-time and trigger corrective measures.

Supply Chain and Logistics: Ability to track shipments in real-time and detect and report on potential delays in arrival.

Real Time Streaming & Event Processing Analytics

With exploding data from increased number of connected devices, there is an increase in large volumes of dynamically changing data; not only the data moving within organizations, but also outside the firewall. High-velocity data brings high value, especially to volatile business processes. However, some of this data loses its operational value in a short time frame. Big Data allows the luxury of time in processing for actionable insight. Fast Data, on the other hand, requires extracting the maximum value from highly dynamic and strategic data. It requires processing much faster and facilitates taking timely action as close to the generated data as possible. The stream analytics platform delivers on Fast Data with responsiveness. Oracle Edge Analytics pushes processing to the network edge, correlating, filtering and analyzing data for actionable insight in real-time.

The stream analytics platform provides ability to join the incoming streaming events with persisted data, thereby delivering contextually aware filtering, correlation, aggregation and pattern matching. It delivers lightweight, out of the box adapters for common event sources. It also provides an easy-to-use adapter framework for custom adapter development. With this platform, organizations can identify and anticipate opportunities, and threats represented by seemingly unrelated events. Its incremental processing paradigm can process events using a minimum amount of resources providing extreme low latency processing. It also allows it to create extremely timely alerts, and detect missing or delayed events immediately, such as the following:

Correlated events: If event A happens, event B almost always follows within 2 seconds of it.

Missing or Out-of-Sequence events: Events A, B, C should occur in order. C is seen immediately after A, without B.

Causal events: Weight of manufactured items is slowly trending lower or the reading falls outside acceptable norms. This signals a potential problem or future maintenance need.

In addition to real-time event sourcing, the stream analytics platform design environment and runtime execution supports standards-based, continuous query execution across both event streams and persisted data stores like databases and high performance data grids. This enables the platform to act as the heart of intelligence for systems needing answers in microseconds or minutes to discern patterns and trends that would otherwise go unnoticed. Event Processing use cases require the speed of in-memory processing with the mathematical accuracy and reliability of standard database SQL. This platform queries listen to incoming event streams and execute registered queries continuously, in-memory on each event, utilizing advanced, automated algorithms for query optimization. While based on an in-memory execution model, however, this platform leverages standard ANSI SQL syntax for query development, thus ensuring accuracy and extensibility of query construction. This platform is fully compliant with the ANSI SQL '99 standard and was one of the first products available in the industry to support ANSI SQL reviewed extensions to standard SQL for real-time, continuous query pattern matching. The CQL engine optimizes the execution of queries within a processor leaving the developer to focus more on business logic rather than optimization.

The stream analytics platform allows for both SQL and Java code to be combined to deliver robust event processing applications. Leveraging standard industry terminology to describe event sources, processors, and event output or sinks, this platform provides a meta-data driven approach to defining and manipulating events within an application. Its developers use a visual, directed-graph canvas and palette for application design to quickly outline the flow of events and processing across both event and data sources. Developing the flow through drag and drop modeling and configuration wizards, the developer can then enter the appropriate metadata definitions to connect design to implementation. When necessary or preferred, with one click, developers are then able to drop into custom Java code development or use the Spring® framework directly to code advanced concepts into their application.

Event driven applications are frequently characterized by the need to provide low and deterministic latencies while handling extremely high rates of streaming input data. The underpinning of the stream analytics platform is a lightweight Java container based on an OSGi® backplane. It contains mature components from the WebLogic JEE application server, such as security, logging and work management algorithms, but leverages those services in a real-time event-processing environment. An integrated real-time kernel provides unique services to optimize thread and memory management supported by a JMX framework enabling the interaction with the container for performance and configuration. Web 2.0 rich internet applications can communicate with the platform using the HTTP publish and subscribe services, which enables them to subscribe to an application channel and have the events pushed to the client. With a small footprint this platform is a lightweight, Java-based container, that delivers faster time-to-production and lower total cost of ownership.

The stream analytics platform has the ability to handle millions of events per second with microseconds of processing latencies on standard, commodity hardware or optimally with Oracle Exalogic and its portfolio of other Engineered Systems. This is achieved through a complete "top-down" layered solution, not only with a design focus on high performance event processing use cases, but also a tight integration with enterprise-class real-time processing infrastructure components. The platform architecture of performance-oriented server clusters focuses on reliability, fault tolerance and extreme flexibility with tight integration into the Oracle Coherence technology and enables the enterprise to predictably scale mission-critical applications across a data grid, ensuring continuous data availability and transactional integrity.

In addition, this platform allows for deterministic processing, meaning the same events can be fed into multiple servers or the same server at different rates achieving the same results each time. This enables incredible advantages over systems that only rely on the system clock of the running server.

Stream Analytics Architecture

Embodiments of the present disclosure provide techniques for receiving and processing data streaming from an event source. In various embodiments, stream analytics is an event processing server designed to support event processing applications in embedded environments such as those supported by the Java Embedded Suite (JES). The stream analytics system comprises a stream analytics server, stream analytics Visualizer, a command-line administrative interface, and an Integrated Development Environment (IDE). The stream analytics server hosts logically related resources and services for running stream analytics applications. Servers may be grouped into and managed as domains. A domain can have one server (standalone-server domain) or many (multiserver domain). The stream analytics' domains and servers may be managed through the stream analytics visualizer and the command-line administrative interface. In some embodiments, the stream analytics visualizer is a web-based user interface through which stream analytics applications running on the stream analytics server are deployed, configured, tested, and monitored. In some embodiments, the command-line administrative interface enables a user to manage the server from the command line and through configuration files. For example, the user may start and stop domains and deploy, suspend, resume, and uninstall an applications. Advantageously, the stream analytics system is developed to simplify the complex event processing operations and make them available even to users without any technical background.

A stream analytics application receives and processes data streaming from an event source. That data might be coming from one of a variety of places, such as a monitoring device, a financial services company, or a motor vehicle. While monitoring the data, the application might identify and respond to patterns, look for events that meet specified criteria and alert other applications, or do other work that requires immediate action based on quickly changing data.

The stream analytics system uses an event-driven architecture where an application is broken into a set of stages (nodes) connected by queues. In stream analytics, the channel component represents queues while all of the other components represent stages. Every component in the data processing system, e.g., an event processing network (EPN), has a role in processing the data. The data processing system is the primary point where application components are wired together. In various embodiments, using a CEP integrated development environment (IDE), a user can use an EPN Editor and visualizer that provides a graphical view of the EPN and offers visualization and navigation features to help the user build CEP applications. In some embodiments, the EPN is linear with data entering the EPN through an adapter where it is converted to an event. After the conversion, events pass through the stages from one end to the other. At various stages in the EPN, the component can execute logic or create connections with external components as needed t is the primary point where application components are wired together. Using Oracle CEP IDE for Eclipse, you can use an EPN Editor that provides a graphical view of the EPN and offers visualization and navigation features to help you build Oracle CEP applications FIG. 1 is a graphical representation of a data processing system such as an EPN that may incorporate an embodiment of the present disclosure. As illustrated in FIG. 1, the EPN 100 may be made up of several stages that each serve a distinct role in the processing of events in an event stream. Events are by definition time-based, so a stream is that sense the natural condition of events. It is how event data arrives at an event processing application. To process events with event processing, an application is built whose core is an EPN such as EPN 100. The EPN 100 is made up of stages that each serve a distinct role in processing events, from receiving event data to querying the data to executing logic based on what is discovered about the events. The application receives raw event data, binds the data to event types, then routes the events from stage to stage for processing. Connected stages in an EPN provide a way to execute different kinds of code against events passing through the EPN. Kinds of stages can include an adapter, a processor, and a bean. More specifically, in various embodiments, the EPN 100 includes event sources 105 that receive events, channels 110 that connect stages, an event processing service (EPS) 115 (also referred to as CQ Service) that is configured to provide an environment for processing event streams, and/or sinks 120 that perform general processing logic.

In some embodiments, event sources 105 include, without limitation, an adapter (e.g., JMS, HTTP, and file), a channel, a processor, a table, a cache, and the like. For example the event source 105 may include one or more adapters. The one or more adapters may interface directly to an input and output stream and relation sources and sinks. The one or more adapters may be configured to understand the input and output stream protocol, and are responsible for converting the event data into a normalized form that can be queried by an application processor. For example, an adapter could receive event data and bind it to an event type instance, then pass the event along to EPS 115. The one or more adapters may be defined for a variety of data sources and sinks. The channels 110 act as event processing endpoints. Among other things, the channels 110 are responsible for queuing event data until an event processing agent can act upon the event data. The EPS 115 may be event processing agents configured to perform action upon the event data such as the execution of queries on the event data.

The event sources 105 generate event streams that are received by EPS 115. EPS 115 may receive one or more event streams from one or more event sources. For example, as shown in FIG. 1, EPS 115 receives a first input event stream 125 from event source 105(a), a second input event stream 130 from event source 105(b), and a third event stream 135 from event source 105(c). One or more event processing applications (140, 145, and 150) may be deployed on and executed by EPS 115. An event processing application executed by EPS 115 may be configured to listen to one or more input event streams, process the events received via the one or more event streams based upon processing logic that selects one or more events from the input event streams as notable events. The notable events may then be sent to one or more event sinks 120 in the form of one or more output event streams. For example, in FIG. 1, EPS 115 outputs a first output event stream 155 to event sink 120(a), and a second output event stream 160 to event sink 120(b). Examples of event sinks include, without limitation, an adapter (e.g., JMS, HTTP, and file), a channel, a processor, a cache, and the like. In certain embodiments, event sources, event processing applications, and event sinks are decoupled from each other such that one can add or remove any of these components without causing changes to the other components.

In some embodiments, EPS 115 may be implemented as a Java server comprising a lightweight Java application container, such as one based upon Equinox OSGi, with shared services. In some embodiments, EPS 115 may support ultra-high throughput and microsecond latency for processing events, for example, by using JRockit Real Time. EPS 115 may also provide a development platform (e.g., a complete real time end-to-end Java Event-Driven Architecture (EDA) development platform) including tools (e.g., CEP Visualizer and CEP IDE) for developing event processing applications. An event processing application is configured to listen to one or more input event streams, execute logic (e.g., a query) for selecting one or more notable events from the one or more input event streams, and output the selected notable events to one or more event sources via one or more output event streams.

FIG. 1 provides a drilldown for one such event processing application 145. As shown in FIG. 1, event processing application 145 is configured to listen to input event stream 130, execute a continuous query using CQL processor 165 comprising logic for selecting one or more notable events from input event stream 130, and output the selected notable events via output event stream 160 to event sink 120(b). Although event processing application 145 is shown as listening to one input stream and outputting selected events via one output stream, this is not intended to be limiting. In alternative embodiments, an event processing application may be configured to listen to multiple input streams received from one or more event sources, select events from the monitored streams, and output the selected events via one or more output event streams to one or more event sinks. The same query can be associated with more than one event sink and with different types of event sinks.

Due to its unbounded nature, the amount of data that is received via an event stream is generally very large. Consequently, it is generally impractical and undesirable to store or archive all the data for querying purposes. The processing of event streams requires processing of the events in real time as the events are received by EPS 115 without having to store all the received events data. EPS 115 therefore provides a special querying mechanism that enables processing of events to be performed as the events are received by EPS 115 without having to store all the received events. In particular, event-driven applications of EPS 115 are typically rule-driven and these rules may be expressed in the form of continuous queries that are used to process input streams. A continuous query may comprise instructions (e.g., business logic) that identify the processing to be performed for received events including what events are to be selected as notable events and output as results of the query processing. Continuous queries may be persisted to a data store and used for processing input streams of events and generating output streams of events. Continuous queries typically perform filtering and aggregation functions to discover and extract notable events from the input event streams. As a result, the number of outbound events in an output event stream is generally much lower than the number of events in the input event stream from which the events are selected.

Unlike a SQL query that is run once on a finite data set, a continuous query that has been registered by an application with EPS 115 for a particular event stream may be executed each time that an event is received in that event stream. As part of the continuous query execution, EPS 115 evaluates the received event based upon instructions specified by the continuous query to determine whether one or more events are to be selected as notable events, and output as a result of the continuous query execution. The continuous query may be programmed using different languages. In certain embodiments, continuous queries may be configured using the CQL provided by Oracle Corporation and used by Oracle's Complex Events Processing product offerings. Oracle's CQL is a declarative language that can be used to program queries (referred to as CQL queries) that can be executed against event streams. In certain embodiments, CQL is based upon SQL with added constructs that support processing of streaming events data.

In various embodiments, an event processing application may be composed of the following component types: (i) one or more adapters 170 that interface directly to the input and output stream and relation sources and sinks; (ii) one or more channels 110 that act as event processing endpoints; (iii) one or more application processors 175 (or event processing agents) configured to consume normalized event data from a channel, process it using queries to select notable events, and forward (or copy) the selected notable events to an output channel; (iv) one or more beans 180 configured to listen to the output channel, and are triggered by the insertion of a new event into the output channel; and (v) one or more event beans 185 registered to listen to the output channel, and are triggered by the insertion of a new event into the output channel. In certain embodiments, an assembly file may be provided for an event processing application describing the various components of the event processing application, how the components are connected together, event types processed by the application. Separate files may be provided for specifying the continuous query or business logic for selection of events.

The adapters 170 may configured to understand the input and output stream protocol, and are responsible for converting the event data into a normalized form that can be queried by an application processor. The adapters 170 may forward the normalized event data into channels or output streams and relation sinks. Event adapters may be defined for a variety of data sources and sinks. The processors 175 may comprise a CQL processor that contains query code in Continuous Query Language that may be associated with one or more CQL queries that operate on the events offered by an input channel (e.g., a channel 110). For example, the processor's CQL code can query the events (as SQL code queries database rows), looking for particular patterns in the data as it flows through the EPN 100. The CQL processor may be connected to an output channel (e.g., a channel 110) to which query results are written. For example, events that meet the pattern criteria could be passed along to a bean 180 (e.g., written in Java) or code, where the data could be used in a calculation with data retrieved from an external source. A further downstream bean 185 or code could use the calculation result to execute a process using an external component. The beans 185 or code may be registered to listen to the output channel 110, and are triggered by the insertion of a new event into the output channel 110. In some embodiments, the processing logic for the beans 180/185 may be written in a programming language such as Java or a plain-old-Java-object (POJO). In some embodiments, the processing logic may use the CEP event bean API so that the beans 180/185 can be managed by CEP. Any component designed to receive or send events in the EPN 100 (such as EPN stages) may be been implemented specifically to do so. Components that are able to receive events are known as the event sinks 120, while components that send events are known as the event sources 105. A single component could be both an event source and a sink. The described stage components included in event processing, such as adapters and the components on which CQL processors are based, already support required functionality. Developers can add event sink and source support to beans, new adapters, and other code they write by implementing interfaces from the CEP API.

It should be appreciated that system 100 depicted in FIG. 1 may have other components than those depicted in FIG. 1. Further, the embodiment shown in FIG. 1 is only one example of a system that may incorporate an embodiment of the present disclosure. In some other embodiments, system 100 may have more or fewer components than shown in FIG. 1, may combine two or more components, or may have a different configuration or arrangement of components. System 100 can be of various types including a service provider computer, a personal computer, a portable device (e.g., a mobile telephone or device), a workstation, a network computer, a mainframe, a kiosk, a server, or any other data processing system. In some other embodiments, system 100 may be configured as a distributed system where one or more components of system 100 are distributed across one or more networks in the cloud.

The one or more of the components depicted in FIG. 1 may be implemented in software, in hardware, or combinations thereof. In some embodiments, the software may be stored in memory (e.g., a non-transitory computer-readable medium), on a memory device, or some other physical memory and may be executed by one or more processing units (e.g., one or more processors, one or more processor cores, one or more GPUs, etc.).

Target User Estimation For Dynamic Assets

Consumers group together and create new trends and demands that can rapidly coalesce into opportunity. Real-time marketing technology capitalizes on this opportunity. Utilizing real-time data and personalization in marketing messages produces more impact. Interesting real-time data is any data that can change and influence the customer response: price, inventory, popularity, social groundswell, etc. An advanced, integrated solution for real-time advertising is required to be able to listen to a collective voice and to respond in a relevant and engaging way. For targeted advertising, one of the problems is determining the target customers or the collective voice. This problem is especially true when the viewership of the asset (e.g., an advertisement) and the asset are dynamic or constantly changing in the physical world, e.g., in the instance that the advertisement is moving along a bus route and the target customers are pedestrians traveling on the sidewalks. In the online world, targeted advertising is now commonplace. Advertisers use all sorts of data to target their messages to specific types of users, including financial and demographic information, context and location, and users' previous behaviors. The difference is online ad companies usually recognize potential targets using their cookies, not their actual eyeballs.

When it comes to offline advertising in the physical world, it's a different story. Publicly available data might help advertisers place their physical world or out-of-home ads in slightly more appropriate places, but they're not typically targeted to specific people or groups of people. That's beginning to change, however. In one example, messages were written on a digital advertising screen by humans who relied on other humans to tell them when a particular target customer (e.g., driving a certain brand car) was approaching. This example however is not easily scalable and economic. In another example, some companies are experimenting with facial recognition technology in the physical world and using it to tailor ad messages based on gender and age information. Other companies are turning to geofencing, which is a location-based digital marketing tool that lets marketers send messages to smartphone users in a defined geographic area. For example, shoppers that arrive at a mall can be targeted with ads by stores located in that mall simply because of their geographic location. Digital marketers can take the GPS capabilities to feed ads to people who are geographically ready to make sales decisions. These example however rely on sophisticated facial recognition software that requires direct line of sight with controlled environmental conditions (e.g., a customer in a check-out line or a very defined geographic area with clear boundaries), and/or are limited to a single dimension of data such as the geographic proximity of a mobile device to a product/service.

In order to overcome these limitations of conventional targeted advertising systems in the physical world, aspects of the present technical solution include estimating potential targets (e.g., customers) for different geographic areas and times based on historical location and temporal data of potential targets, and determining advertisements for dynamic assets (e.g., electronic advertisement displays) based on the current time and geographic location of the dynamic assets. For example, polygons may positioned on a geographic map that approximate a target field of view for one or more dynamic assets, and the target field of view provides a geo fence (e.g., a polygon on a map) that identifies the potential targets at various times. A profile and/or taxonomy generated for each of the identified potential targets and a target profile and/or taxonomy for a demographic being targeted by an advertiser are used to determine the advertisement to be displayed on the dynamic asset and viewed by the potential target customers in the target field of view at a set time or range of times.

In various embodiments, the present technical solution may utilize streaming analytics (e.g., using the event processing network 100 described with respect to FIG. 1) on two streams of data including: (pipeline 1) location and temporal data for potential targets; and (pipeline 2) location and temporal data for dynamic assets. The streaming analytics outputs an estimation of the potential target viewership in one or more polygons (target field of view) with potential advertisements for display from pipeline 1, and the actual advertisements to be displayed on dynamic assets from pipeline 2. This solution is an improvement over prior industry solutions that utilize targeted advertising, specifically geotargeting, because geotargeting typically involves: (i) displaying ads on a target customer's mobile device and the target customer must be within either an app or a mobile web browsing session (within a regular retail environment, only a small portion of all people might be doing one of these needed actions leading to scalability issues), and/or (ii) a very defined area with clear boundaries for the geofence boundary such that the target customer is well defined (does not work well in a cluttered area where one geofence zone might blend into an adjacent geofence zone).

Architecture for Target User Estimation for Dynamic Assets

Figure 2:
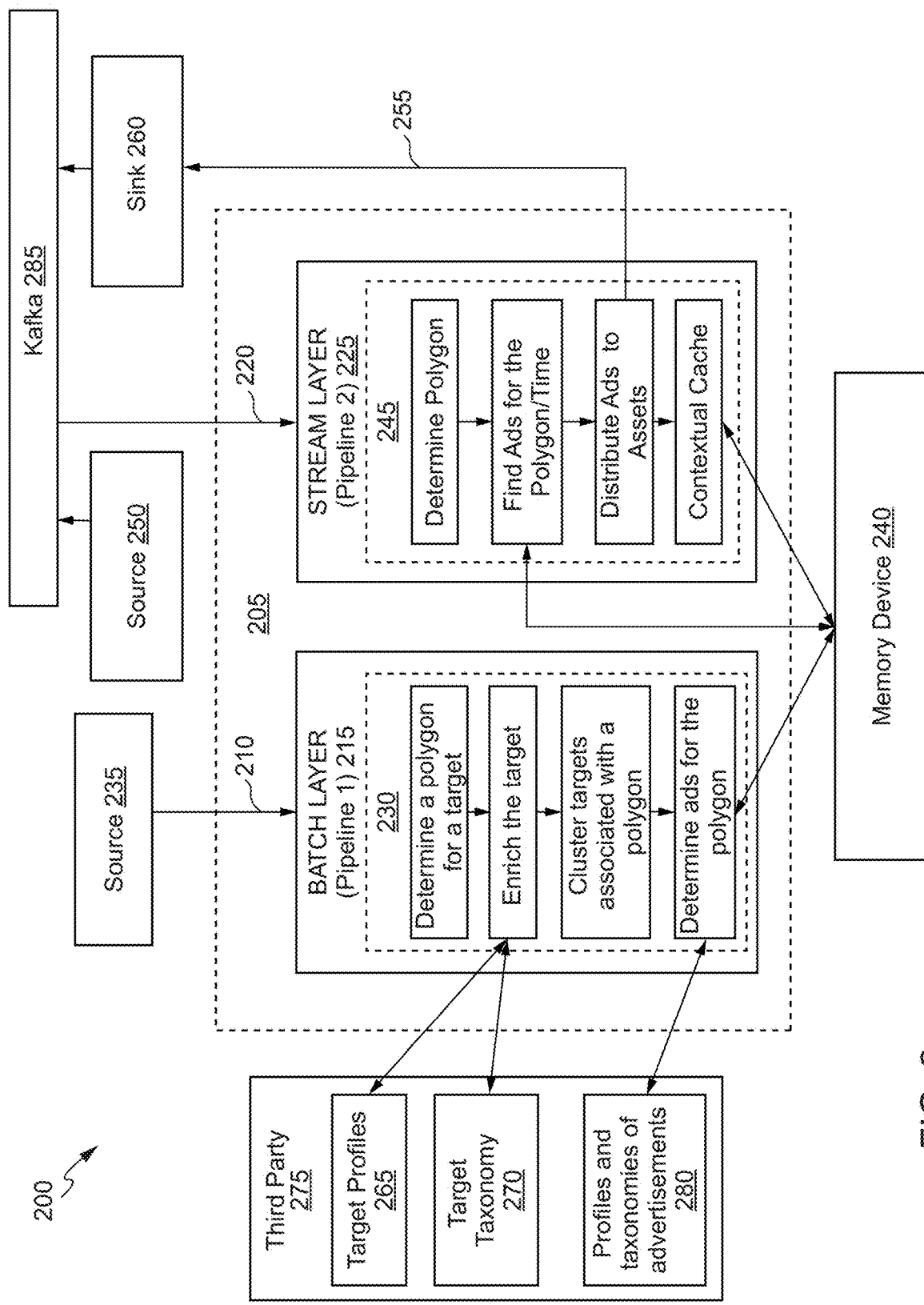
FIG. 2 is an illustration of a simplified high level diagram of an event processing system in accordance with various embodiments.

In various embodiments, systems, methods, and computer-readable media are disclosed for receiving and processing data streaming from one or more event sources. FIG. 2 illustrates a framework 200 for processing data streaming from one or more event sources in order to approximate a target viewership for dynamic assets in accordance with an exemplary embodiment using EPN 205 (e.g., EPN 100 as described with respect to FIG. 1). Specifically, EPN 205 may be configured to process a first data stream 210 in a batch layer or first pipeline 215 and output polygons (representative of an approximate target viewership) with the associated advertisements, and process a second data stream 220 in a stream layer or second pipeline 225 and output an advertisement to be displayed on a dynamic asset based on an associated approximate target viewership. As used herein, when an action is "triggered by" or "based on" something, this means the action is triggered or based at least in part on at least a part of the something.

In various embodiments, a pipeline integrates a number of data sources and sinks with multi-stage processing to provide a desired output. The first pipeline 215 may comprise an event processing application 230 that is configured to listen to the first data stream 210 from data source 235, execute a continuous query using a processor (e.g., a CQL processor) comprising logic for obtaining information for potential targets (e.g., unique identifier (ID), position data (P), and temporal data (T)) from the first data stream 210, determining one or more polygons (K) on a map for a potential target (e.g., customer) based on the position data (P), associating the potential target and the temporal data (T) with the one or more polygons (K), enriching the target with profile and taxonomy data, clustering targets associated with a polygon (K) to approximate the target viewership (e.g., a predominant or amalgamate profile and taxonomy determined via statistical analysis) in the polygon (K), matching and associating potential advertisements (V) with the polygon (K) based on the approximate target viewership of the polygon (K) and profiles or taxonomies of advertisements (V), and outputting the polygon (K) as (P,T) with the associated advertisements (V) to a memory device 240.

The second pipeline 225 may comprise an event processing application 245 that is configured to listen to the second data stream 220 from data source 250, execute a continuous query using a processor (e.g., a CQL processor) comprising logic for obtaining position data (P') and temporal data (T') for a dynamic asset (e.g., an advertisement display on a bus driving on a route) from the second data stream 215, determining one or more polygons (K') on a map from the position data (P') and temporal data (T'), obtaining one or more advertisements (V) from a memory device 240 (e.g., using the data output from the first pipeline 215 into the memory device 240) based on the determined one or more polygons (K'), and distribute or output an advertisement (V') based on business rules via output event stream 255 to event sink 260. In some embodiments, event processing application 245 is further configured to cache the determined one or more polygons (K'), the temporal data (T'), and the distributed advertisements (V') in a memory device 250 (e.g., a database). Although event processing applications 230, 245 are shown as listening to one input stream and outputting selected events via one output stream, this is not intended to be limiting. In alternative embodiments, the event processing applications 230, 245 may be configured to listen to multiple input streams received from one or more event sources, select events from the monitored streams, and output the selected events via one or more output event streams to one or more event sinks. The same query and process can be associated with more than one event sink and with different types of event sinks.

In various embodiments, event processing application 230 is configured to listen to the first data stream 210 from data source 235. The data stream 210 may be non-continuous and provide batch data at periodic times (e.g., once a day, twice a day, once an hour, once a week, etc.). The data stream 210 may have an associated schema "S," the schema comprising time information and a set of one or more named attributes. All events that belong to a particular event stream conform to the schema associated with that particular event stream. Accordingly, for an event stream (s, T), the event stream may have a schema 'S' as (<time_stamp>, <attribute(s)>), where <attributes> represents the data portion of the schema and can comprise one or more attributes. For example, the schema for a potential target event stream may comprise attributes <unique identifier>, <position>, and <time>. Each batch of events received via the data stream 210 may have a time stamp and the three attributes. For example, the potential target event stream may receive the following events and associated timestamps:

Batch 1:
. . .
(<timestamp_N>, <5553226, 37.2090° N, 93.2923° W, 235317.00>)
(<timestamp_N>, <5552368, 40.7128° N 74.0060° W, 204511.000>)
(<timestamp_N>, <5550123, 39.8822° N 116.4066° E, 240000.00>)
(<timestamp_N>, <5550001, 40.7128° N 74.0060° W, 113352.00>)
(<timestamp_N>, <5556162, 34.0522° N, 118.2437° W, 142840.00>)
. . .

Batch 2:
. . .
(<timestamp_N+1>, <5550100, 34.0522° N, 118.2437° W, 221318.00>)
(<timestamp_N+1>, <5550840, 34.0522° N, 118.2437° W, 193007.00>)
(<timestamp_N+1>, <5554679, 25.7617° N, 80.1918° W, 155130.00>)
(<timestamp_N+1>, <5550113, 41.8781° N, 87.6298° W, 154712.00>)
(<timestamp_N+1>, <5559175, 40.9584° N, 75.9746° W, 183216.00>)
. . .

In the above data stream (<timestamp_N>, <5553226, 37.2090° N, 93.2923° W, 235317.000>), the event is <5553226, 37.2090° N, 93.2923° W, 235317.000> with attributes "<unique identifier>, <position (latitude and longitude)>, and <time (hour, minutes, seconds)>. The unique identifier may be associated with a potential target (e.g., a customer), the position may be the location of a mobile device of the potential target, and the time may be the time the mobile device of the potential target was at the location. The timestamp associated with the batch is "timestamp_N". A non-continuous event stream is thus a periodic batch of events, each event having the same series of attributes. In certain embodiments, the source 235 is an entity, application, sensor, etc. capable of obtaining the attributes <unique identifier>, <position>, and <time> from a potential target, for example, a cell phone company or mobile application.

Figure 3A:
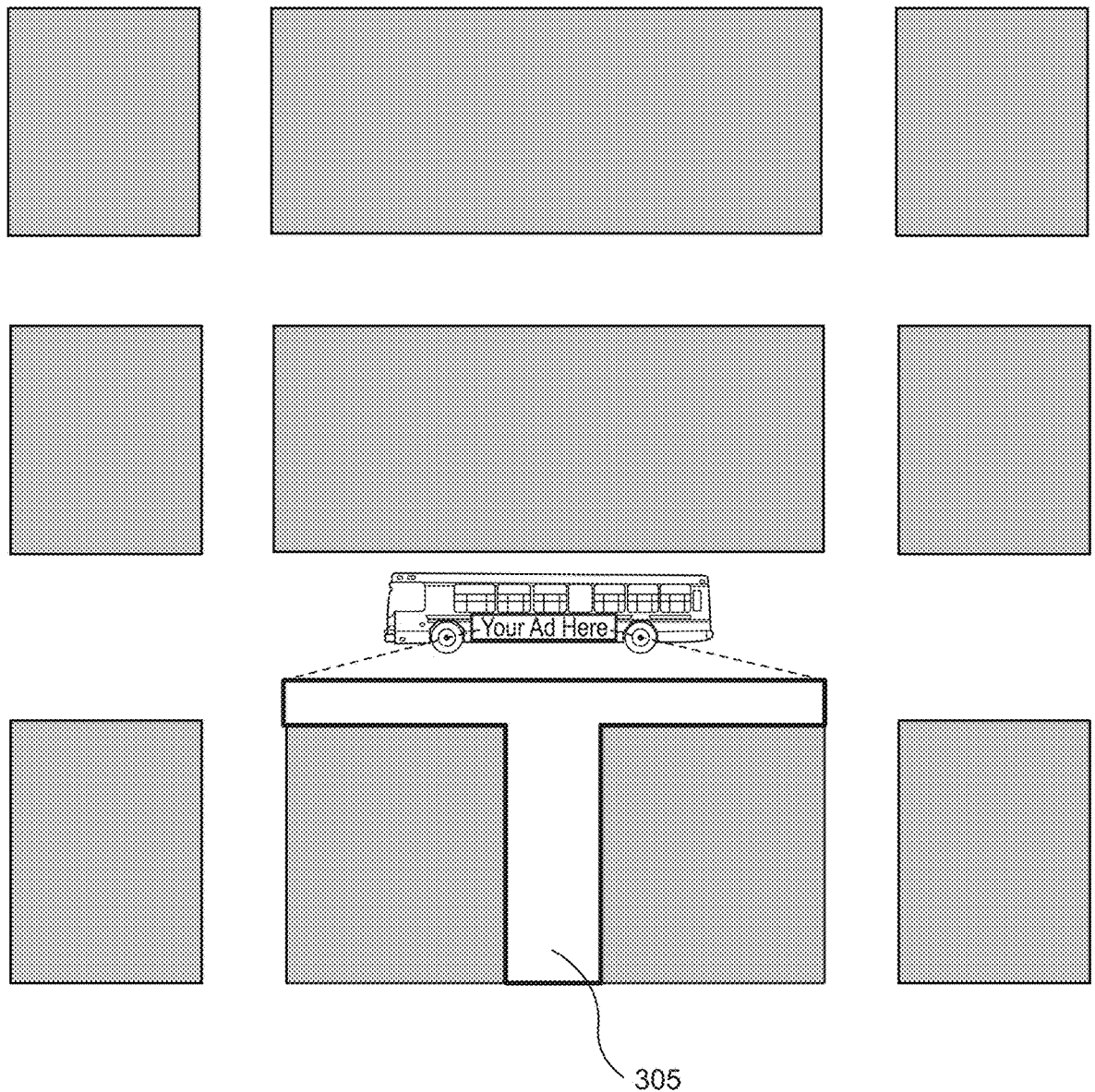
FIGS. 3A and 3B depict various potential target viewership of a dynamic asset in accordance with various embodiments.
Figure 3B:
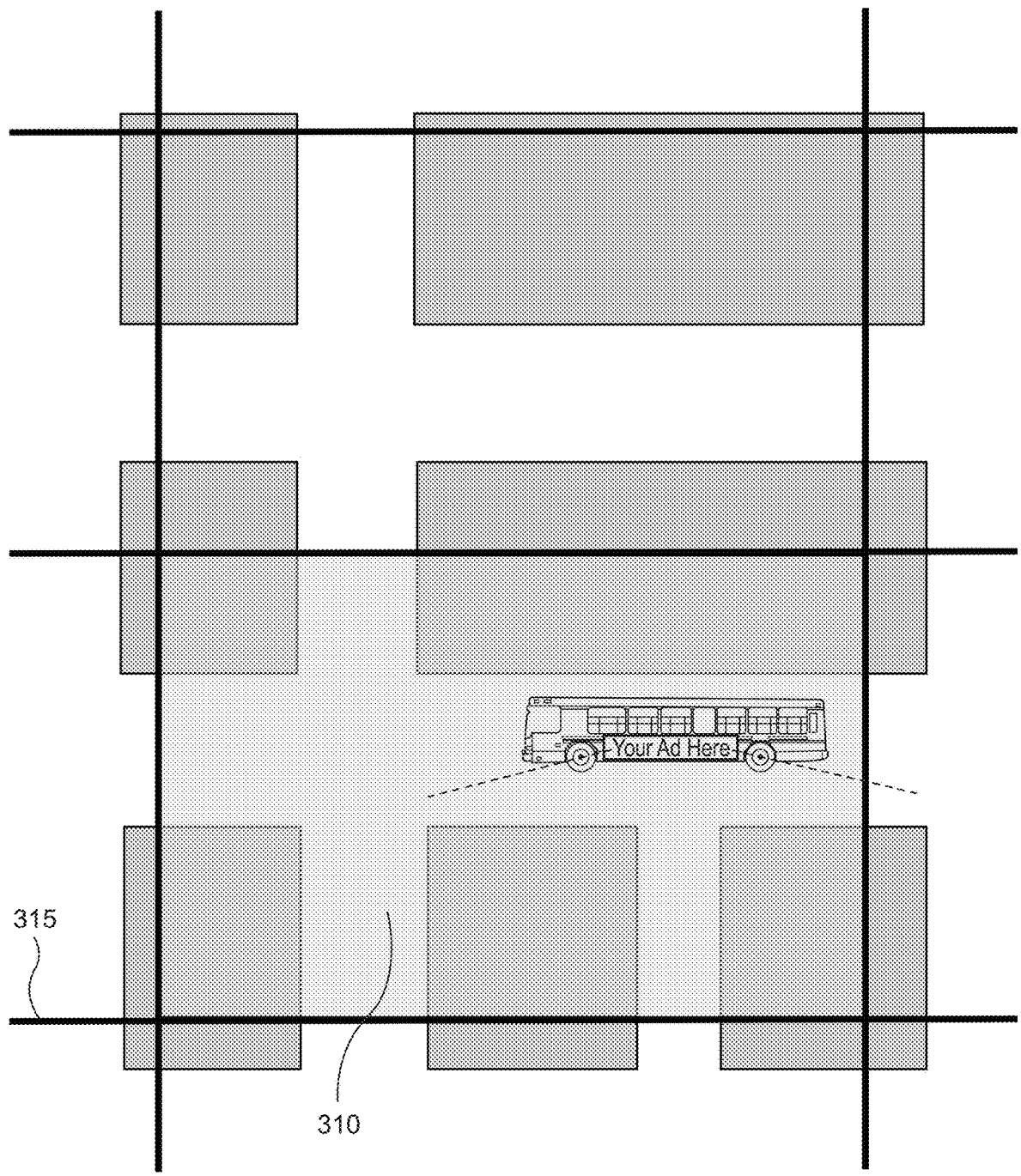

In some embodiments, event processing application 230 is further configured to determine an instance of one or more polygons (K) on a map for a potential target (e.g., customer) based on the position data (P) and the temporal data (T). For example, a geographic map of a location such as a district, a town, a city, a county, a state, a country etc., may be pre-generated that comprises a grid of polygons. In some embodiments, the polygons may be different in shape such as amorphous representing potential targets within the viewing angle of a dynamic asset (e.g., an advertisement display) within the location. As shown in FIG. 3A, a potential target viewership of a dynamic asset can be approximated using the polygons 305, which covers street, sidewalk, and building front areas where potential targets for viewing a dynamic asset may be standing, walking, driving, etc. In other embodiments, the polygons may be the same shape such as squares or rectangles representing squares or rectangles of the grid representing an approximation of the potential targets that could view the dynamic asset (e.g., an advertisement display) within the location. As shown in FIG. 3B, a potential target viewership of a dynamic asset can be determined more easily using the polygons 310 of grid 315, which have a consistent shape and cover a larger area (an approximation of the potential targets viewing the dynamic asset). Large polygons may be used for rural areas or less densely populated areas and smaller sized polygons may be used for urban or more densely populated areas.

Once the map of polygons is generated, the event processing application 230 treats each target information as an event (e.g., <5553226, 37.2090° N, 93.2923° W, 235317.000>) and uses the position data (P) and the temporal data (T) of a potential target identified by the unique identifier to determine an instance of the one or more polygons (K) that would comprise the potential target. In various embodiments, the event processing application 230 associates the potential target and the temporal data (T) with the one or more polygons (K). In some embodiments, the association is performed in a table (e.g., a database table) stored in memory device 140. For example, the unique identifier of the potential target and the temporal data (T) for the event may be associated with an instance of the one or more polygons (K) in the table.

In some embodiments, the event processing application 230 is further configured to enrich the potential target associated with the instance of the one or more polygons (K) with profile 265 and taxonomy data 270. In some embodiments, the profile 265 and taxonomy data 270 are obtained from a remote source 275, e.g., a third party supplier of profile and taxonomy data such as an advertising company. For example, the event processing application 230 may send the unique identifier for a potential target to the remote source 275, the remote source 275 may process the request by matching the profile 265 and taxonomy data 270 with received the unique identifier, and forward the matched profile 265 and taxonomy data 270 to the event processing application 230 with the unique identifier such that the event processing application 230 can enrich the potential target associated with the instance of the one or more polygons (K). In some embodiments, the enrichment process includes associating the profile 265 and taxonomy data 270 with the potential target and the instance of the one or more polygons (K) in the table. In some embodiments, the remote source 275 creates profiles 265 of each potential target according to their behavior and activities (e.g., according to buying behavior or personal activities). The remote source 275 also creates taxonomy data 270 (classifications or categories) to create segments of potential targets. For example, the taxonomy data 270 may be used to create targetable audiences such as sports fan or more specifically golfer. This approach of using profiles 265 and taxonomy data 270 helps augment content recommendation for assets such as digital advertisement displays.

In some embodiments, the event processing application 230 is further configured to cluster potential targets associated with the instance of the one or more polygons (K) to approximate the target viewership in the instance of the one or more polygons (K). In some embodiments, the event processing application 230 identifies all potential targets associated with each instance of the one or more polygons (K) for a given time or time range (e.g., between 12 PM and 2 PM), analyzes the data points (e.g., the profile 265 and taxonomy data 270) for each of the identified potential targets to determine different groups of potential targets within each instance of the one or more polygons (K) at the specified time or time range. The event processing application 230 then, using statistical analysis, clusters the data to determine a predominant profile and taxonomy or create an amalgamate profile and taxonomy for an audience associated with each instance of the one or more polygons (K) at the specified time or time range, and associates the predominant or amalgamate profile and taxonomy with each instance of the one or more polygons (K), respectively, at the specified time or time range in the table. The predominant or amalgamate profile and taxonomy approximates the target viewership in each instance of the one or more polygons (K) at the specified time or time range. As should be understood, the event processing application 230 can modify or update the predominant or amalgamate profile and taxonomy for each instance of the one or more polygons (K) continuously or intermittently based on new batches of data received from the source 235.

In some embodiments, the event processing application 230 is further configured to match potential advertisements (V) with the approximate target viewership of the instance of the one or more polygons (K) based on the profiles or taxonomies of advertisements 280 and the predominant or amalgamate profile and taxonomy associated with each instance of the one or more polygons (K). In some embodiments, the profiles or taxonomies of advertisements 280 are obtained from a remote source 275, e.g., a third party supplier of profile and taxonomy data such as an advertising company. For example, the event processing application 230 may request profiles or taxonomies of advertisements 280 from the remote source 275, and the remote source 275 may process the request and forward the profiles or taxonomies of advertisements 280 to the event processing application 230 such that the event processing application 230 can match potential advertisements (V) with the approximate target viewership of the instance of the one or more polygons (K). In some embodiments, the matching process is a rule based matching process. For example, the predominant or amalgamate profile and taxonomy and the profiles or taxonomies of advertisements 280 may be written in Boolean expressions such that they can be compared and scored to determine the advertisements 280 that most closely match (e.g., those with the highest scores) the approximate target viewership of the instance of the one or more polygons (K). In other embodiments, the matching process is a taxonomy based matching process. For example, an equivalence relationship can be set up whereby nodes are equivalent if the sets of documents classified under those nodes have a meaningful overlap (e.g., the advertisements 280 that most closely match the approximate target viewership of the instance of the one or more polygons (K)). In other embodiments, the matching process includes machine learning. For example, a machine learning component could be used to predict the score for a match between the advertisements 280 and the approximate target viewership of the instance of the one or more polygons (K), and the score could be used determine the advertisements 280 that most closely match (e.g., those with the highest scores) the approximate target viewership of the instance of the one or more polygons (K). Alternatively, a machine learning component could be used to predict the preference that the approximate target viewership of the instance of the one or more polygons (K) would have for the advertisements 280. This approach of match potential advertisements (V) with the approximate target viewership of the instance of the one or more polygons (K) helps personalize the advertisement for assets such as digital advertisement displays.

In some embodiments, the event processing application 230 is further configured to output the instance of the one or more polygons (K) as (P,T) with the associated advertisements (V) to the memory device 240. For example, the instance of the one or more polygons (K) are indexed in a table as positional data and temporal data associated with a predominant or amalgamate profile and taxonomy that has been matched with advertisements (V). In some embodiments, each instance of the one or more polygons (K) has an instance for a given time or time range (e.g., between 12 PM and 6 PM) and each instance of each of the one or more polygons (K) is associated with different advertisements (V) based on the matching with the approximate target viewership at the given time or time range. For example, as shown in FIG. 4, Instance 4 of Polygon 101 comprises potential targets: 5553226; 5552368; 55501000; 5550840; 5559175. The approximate target viewership for Instance 4 of Polygon 101 is calculated as Teenager; Sports, and the associated ads for that approximate target viewership include Ad 1: Ticket sales for baseball game tonight; Ad 2: Sporting goods store; Ad3: Ticket Sales for upcoming sporting event at local college; and Ad 4: Video game store. According, the streaming analytics outputs an estimation of the potential target viewership in one or more polygons (target field of view) with potential advertisements for display from pipeline 1.

In various embodiments, the event processing application 245 is configured to listen to the second data stream 220 from data source 250. The data stream 210 may be continuous and provide streaming data. The data stream 220 may have an associated schema "S," the schema comprising time information and a set of one or more named attributes. All events that belong to a particular event stream conform to the schema associated with that particular event stream. Accordingly, for an event stream (s, T), the event stream may have a schema 'S' as (<time_stamp>, <attribute(s)>), where <attributes> represents the data portion of the schema and can comprise one or more attributes. For example, the schema for a dynamic asset event stream may comprise attributes <unique identifier>, <position>, and <time>. Each event received via the data stream 220 may have a time stamp and the three attributes. For example, the potential dynamic asset event stream may receive the following events and associated timestamps:

. . .
   (<timestamp_N>, <9991217, 36.3190° N, 56.5521° W, 071256.00>)
   (<timestamp_N+1>, <9991217, 36.5128° N 56.5532° W, 071530.00>)
   (<timestamp_N+2>, <9991217, 36.5136° N 56.5546° E, 071723.00>)
   (<timestamp_N+3>, <9991217, 36.7128° N 56.5601° W, 072524.00>)
   (<timestamp_N+4>, <9991217, 36.0522° N, 56.5513° W, 072901.00>)
. . .

In the above data stream (<timestamp_N>, <9991217, 36.3190° N, 56.5521° W, 071256.00>), the event is <9991217, 36.3190° N, 56.5521° W, 071256.00> with attributes "<unique identifier>, <position (latitude and longitude)>, and <time (hour, minutes, seconds)>. The unique identifier may be associated with a dynamic asset (e.g., an electronic advertisement display on the side of a bus), the position may be the location of the dynamic asset (e.g., along the bus route), and the time may be the current time that the asset is at the location. The timestamp associated with the batch is "timestamp_N". A continuous event stream is thus a flow of events, each event having the same series of attributes. In certain embodiments, the source 250 is an entity, application, sensor, etc. capable of obtaining the attributes <unique identifier>, <position>, and <time> from the dynamic assets, for example, a GPS locator assigned to a bus. The source 250 may send the data concerning the dynamic assets to a Kafka 285. The Kafka 280 may be configured to store the data received from the source 250 as key value messages in one or more partitions. For stream processing, the Kafka 280 may offer a Streams API that allows for the event processing application 230 to consume the data from the Kafka 280 and write results/output 255 back to the Kafka 280 for consumption by an entity such as a third party advertising company or ultimately the dynamic asset.

In some embodiments, event processing application 245 is further configured to determine an instance of one or more polygons (K') on a map for a dynamic asset based on the position data (P') and the temporal data (T') of the dynamic asset. For example, a geographic map of a location such as a district, a town, a city, a county, a state, a country etc., may be pre-generated that comprises a grid of polygons, as previously described with respect to FIGS. 3A and 3B. Once the map of polygons is generated, the event processing application 245 treats each dynamic asset information as an event (e.g., <9991217, 36.3190° N, 56.5521° W, 071256.00>) and uses the position data (P') and temporal data (T') of a dynamic asset identified by the unique identifier to determine an instance of one or more polygons (K') that presently comprises the dynamic asset.

In some embodiments, event processing application 245 is further configured to obtain the one or more advertisements (V) from the memory device 240 (e.g., using the data output from the first pipeline 215 into the memory device 240) based on the determined instance of one or more polygons (K'). For example, the event processing application 245 uses a query on the data output from the first pipeline 215 into the memory device 240 to identify the instance of the one or more polygons (K) that matches the instance of one or more polygons (K') that presently comprises the dynamic asset. Once the instance of the one or more polygons (K) is identified, then event processing application 245 can obtain the advertisements (V) associated with the instance of the one or more polygons (K) using the table.

In some embodiments, event processing application 245 is further configured to distribute or output advertisement (V') from the obtained advertisements (V) based on business rules via output event stream 255 to event sink 260. In certain embodiments, event processing application 245 determines which advertisement (e.g., Ad 1, Ad 2, Ad 3, etc.) to send to the sink 260 based on business rules provided by a third party such as an advertising company. The business rules are rules that define or constrain advertisements to be distributed to dynamic assets for viewing. For example, business rules may state: (i) a product or service provider has paid a premium and thus their advertisement(s) must be shown at least three time per day, (ii) no alcohol or tobacco advertisements between 6 PM and 12 AM, or (iii) services for a product or service provider have been suspended and thus no advertisements are to be provided for the product or service provider for a predetermined suspension period. Once the obtained advertisements (V) are evaluated in view of the business rules, advertisement (V') is selected for distribution or output event stream 255 to the event sink 260. The sink 260 writes the results/output 255 back to the Kafka 280 for consumption by an entity such as the third party advertising company or ultimately the dynamic asset.

While some embodiments are disclosed herein with respect to using batch sequencing and thus historical data for potential targets, this is not intended to be restrictive. In addition to batch processing, the teachings disclosed herein can also be applied to real-time data and stream processing for potential targets. For example, it is contemplated that pipeline 1 could receive data in real-time from mobile devices of potential targets in one or more polygons (K), receive data in real-time from the assets, and display advertisements (V') in real-time based on an approximate real-time viewership in the one or more polygons (K). Likewise, the batch and streaming data is not restricted to being obtained mobile devices and GPS sensors. For example, the potential target data could be obtained from transaction data such as credit card information. In the instance of transactional data, an estimation of the potential target viewership could be generated based on all transactional data occurring within the one or more polygons.

Advantageously, these approaches allow for contextual stream processing. Moreover, these approaches allow for real-time contextual advertising using historical or real-time data from potential targets and dynamic assets.

Methods for Target User Estimation for Dynamic Assets

Figure 5:
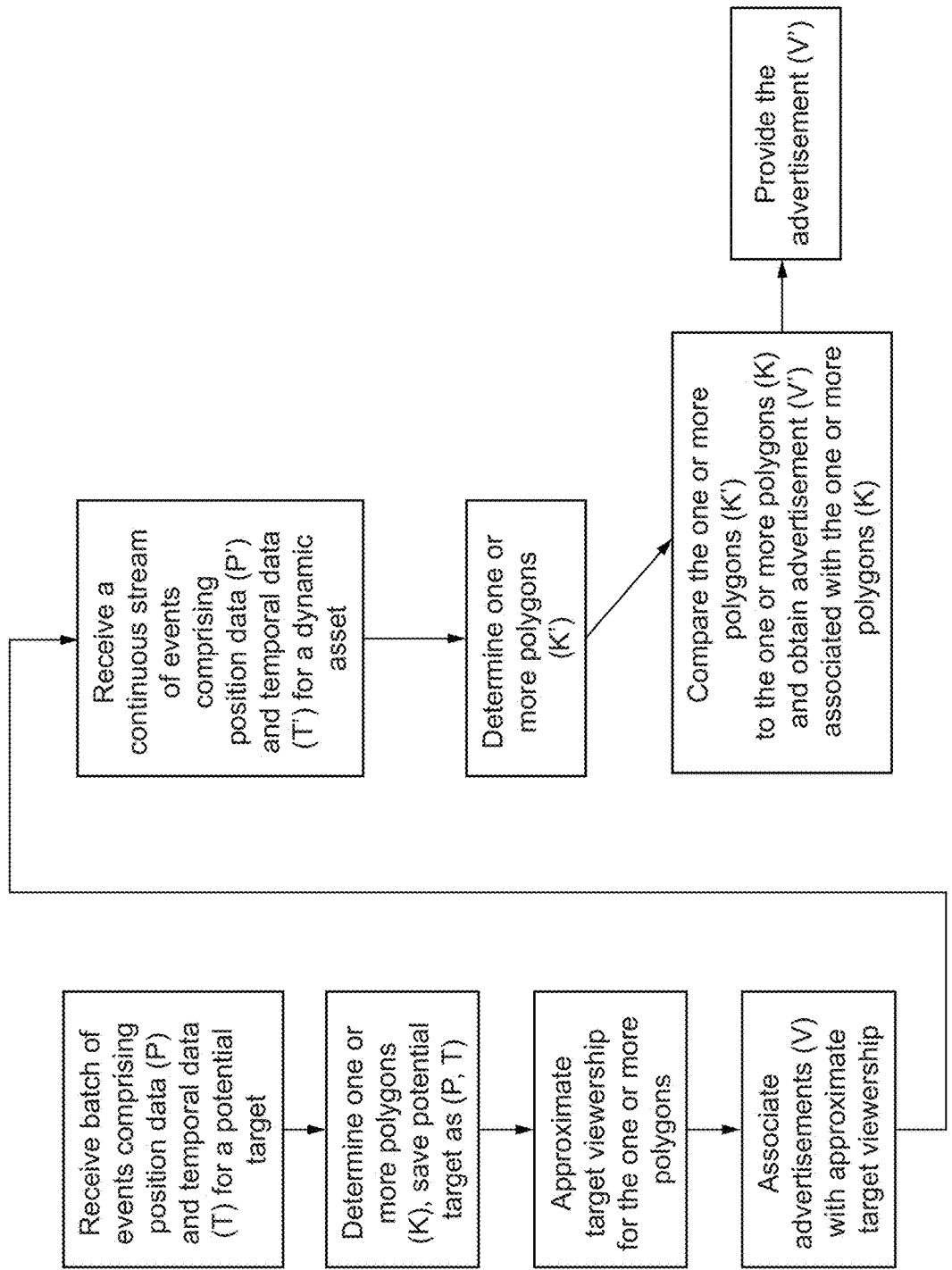
FIG. 5 depicts a flowchart illustrating a process for receiving and processing data streaming from an event source in accordance with various embodiments.

FIG. 5 illustrates a process and operation for processing data streaming from one or more event sources in order to approximate a target viewership for dynamic assets according to various embodiments. Individual embodiments may be described as a process which is depicted as a flowchart, a flow diagram, a data flow diagram, a structure diagram, or a block diagram. Although a flowchart may describe the operations as a sequential process, many of the operations may be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination may correspond to a return of the function to the calling function or the main function.

The processes and/or operations depicted in FIG. 5 may be implemented in software (e.g., code, instructions, program) executed by one or more processing units (e.g., processors cores), hardware, or combinations thereof. The software may be stored in a memory (e.g., on a memory device, on a non-transitory computer-readable storage medium). The particular series of processing steps in FIG. 5 is not intended to be limiting. Other sequences of steps may also be performed according to alternative embodiments. For example, in alternative embodiments the steps outlined above may be performed in a different order. Moreover, the individual steps illustrated in FIG. 5 may include multiple sub-steps that may be performed in various sequences as appropriate to the individual step. Furthermore, additional steps may be added or removed depending on the particular applications. One of ordinary skill in the art would recognize many variations, modifications, and alternatives.

FIG. 5 shows a flowchart 500 that illustrates a process for push notification authentication according to various embodiments. In some embodiments, the processes depicted in flowchart 500 may be implemented by the system of FIG. 1 and framework of FIG. 2. At step 505, a batch of events are received at an even processing network (e.g., the event processing network 100 or 205 as described with respect to FIGS. 1 and 2). In various embodiments, each event within the batch of events comprises position data for a potential target. In some embodiments, each event within the batch of events comprises a unique identifier, position data, and/or temporal data for the potential target. The potential target may be a potential customer of a product or service to be displayed in an advertisement. In alternative embodiments, the events are received as a continuous stream of events at the even processing network. At step 510, one or more polygons are determined, by a first application of the event processing network (e.g., application 230 as described with respect to FIG. 2), that comprise the potential target based on the position data for the potential target. The one or more polygons are part of a grid of polygons overlaid on a geographic map that define an artificial boundary for the geographic map. In various embodiments, the determining that the one or more polygons comprise the potential target comprises determining, by the first application, an instance of the one or more polygons that comprises the potential target based on the position data and the temporal data for the potential target.

At step 515, an approximate target viewership is determined, by the first application, for the one or more polygons based on a profile or taxonomy of the potential target. In various embodiments, the profile or taxonomy data is obtained, by the first application, for the potential target from a third party source. In some embodiments, determining the approximate target viewership for the one or more polygons comprises: (i) identifying, by the first application, all potential targets associated with the one or more polygons including the potential target; (ii) analyzing, by the first application, the profile or taxonomy for each of the potential targets to determine different groups of potential targets within the one or more polygons; and (iii) performing statistical analysis, by the first application, on the different groups of potential targets to determine a predominant or amalgamate profile or taxonomy for the approximate target viewership. In certain embodiments, the approximate target viewership is determined for the instance of the one or more polygons. Consequently, determining the approximate target viewership for the instance of the one or more polygons may comprise: (i) identifying, by the first application, all potential targets associated with the instance of the one or more polygons including the potential target; (ii) analyzing, by the first application, the profile or taxonomy for each of the potential targets to determine different groups of potential targets within the instance of the one or more polygons; and (iii) performing statistical analysis, by the first application, on the different groups of potential targets to determine a predominant or amalgamate profile or taxonomy for the approximate target viewership.

At step 520, an advertisement is associated, by the first application, with the one or more polygons based on the approximate target viewership. In various embodiments, the advertisement is obtained, by the first application, from a third party source. The advertisement may comprise profile and/or taxonomy data. In some embodiments, the associating the advertisement with the one or more polygons comprises obtaining, by the first application, a plurality of advertisements from the third party source. Each of the plurality of advertisements may comprise profile and/or taxonomy data. In certain embodiments, the associating the advertisement with the one or more polygons comprises: (i) matching the predominant or amalgamate profile or taxonomy for the approximate target viewership with profile or taxonomy data of one or more of the plurality of advertisements; and (ii) associating each of the one or more of the plurality of advertisements with the one or more polygons based on the matching. In some embodiments, the approximate target viewership is determined for the instance of the one or more polygons. Consequently, the associating the advertisement with the instance of the one or more polygons may comprise: (i) matching the predominant or amalgamate profile or taxonomy for the approximate target viewership with profile or taxonomy data of one or more of the plurality of advertisements; and (ii) associating each of the one or more of the plurality of advertisements with the instance of the one or more polygons based on the matching.

At step 525, a continuous stream of events is received at the event processing network. In various embodiments, each event in the continuous stream comprises position data for a dynamic asset. In some embodiments, each event in the continuous stream comprises a unique identifier, position data, and/or temporal data for the dynamic asset. The dynamic asset may be moving such that the position data for the dynamic asset changes over time. At step 530, one or more polygons are determined, by a second application (e.g., application 245 as described with respect to FIG. 2), that comprise the dynamic asset based on the position data for the dynamic asset. In some embodiments, the second application is different from the first application. In alternative embodiments, the second application is the same as the first application. In certain embodiments, the determining that the one or more polygons comprise the dynamic asset comprises determining, by the second application, an instance of the one or more polygons that comprises the dynamic asset based on the position data and the temporal data for the dynamic asset.

At step 535, the advertisement is obtained, by the second application, associated with the one or more polygons. In some embodiments, the second application uses a query on the data output from the first application (e.g., the association between the advertisement and the one or more polygons) to identify the one or more polygons that match the one or more polygons that presently comprise the dynamic asset. Once the one or more polygons are identified, then the second application may obtain the advertisement associated with the one or more polygons using a table. In certain embodiments, the obtaining the advertisement comprises obtaining, by the second application, each of the one or more of the plurality of advertisements associated with the instance of the one or more polygon.

At step 535, the advertisement is provided, by the second application, to a sink for display on the dynamic asset. In some embodiments, the advertisement to be provided to the sink is selected from the one or more of the plurality of advertisements based on one or more business rules.

Illustrative Systems

Figure 6:
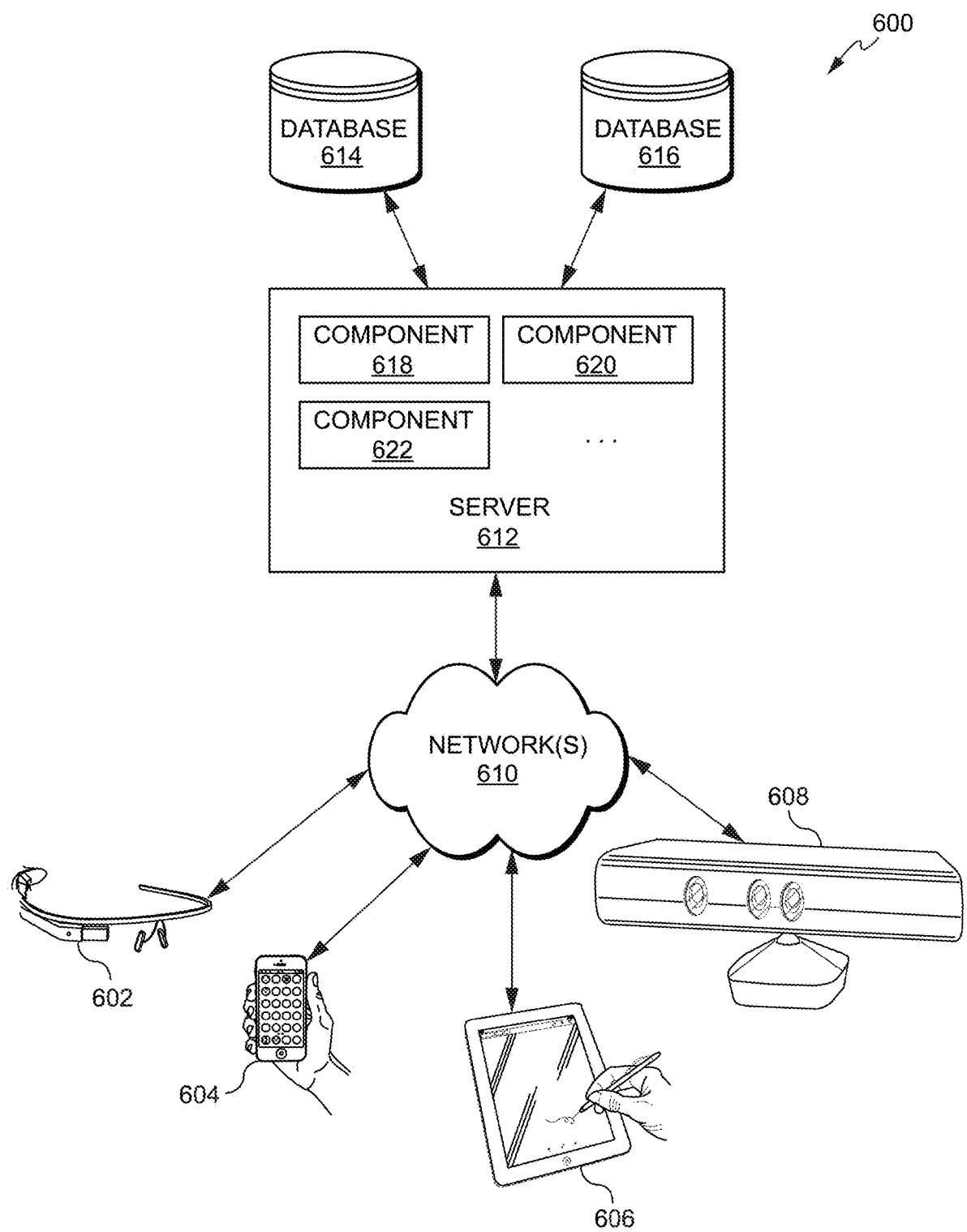
FIG. 6 depicts a simplified diagram of a distributed system for implementing various embodiments.
Figure 7:
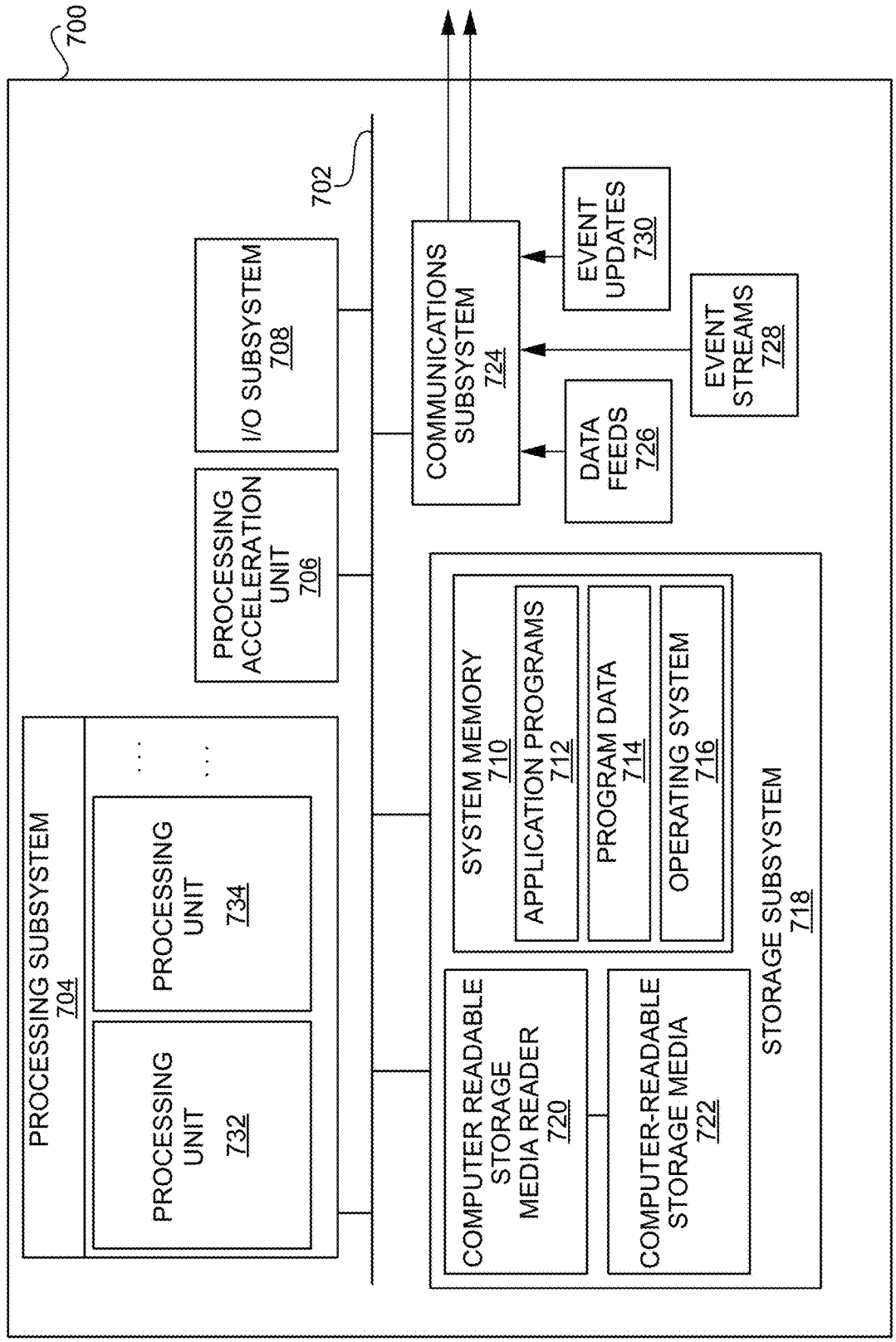
FIG. 7 is a simplified block diagram of one or more components of a system environment by which services provided by one or more components of an embodiment system may be offered as cloud services, in accordance with various embodiments.
Figure 8:
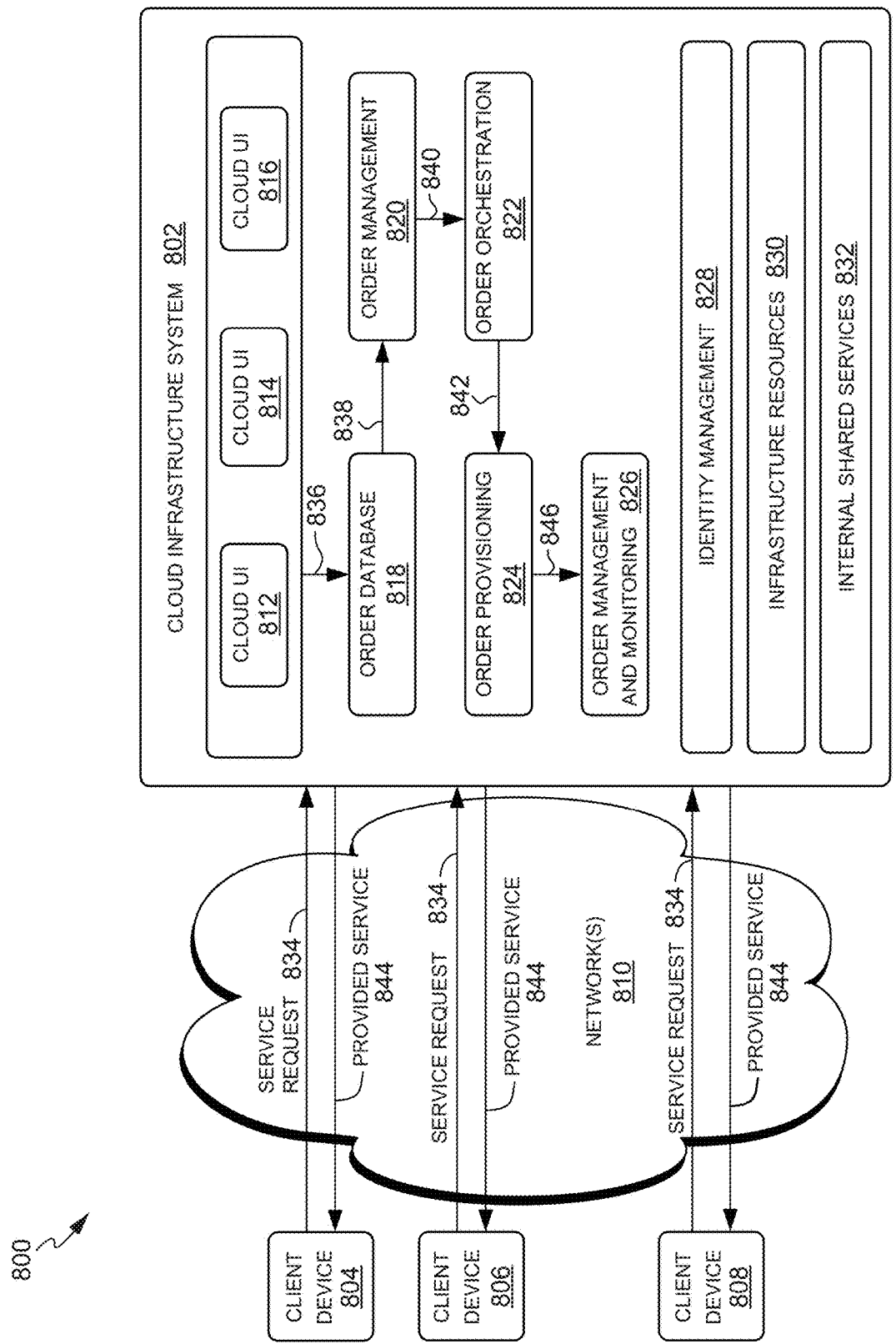
FIG. 8 illustrates an example computer system that may be used to implement various embodiments.

FIGS. 6-8 illustrate aspects of example environments for implementing aspects of the present disclosure in accordance with various embodiments. FIG. 6 depicts a simplified diagram of a distributed system 600 for implementing an embodiment of the present disclosure. In the illustrated embodiment, the distributed system 600 includes one or more client computing devices 602, 604, 606, and 608, which are configured to execute and operate a client application such as a web browser, proprietary client (e.g., Oracle Forms), or the like over one or more network(s) 610. The server 612 may be communicatively coupled with the remote client computing devices 602, 604, 606, and 608 via network 610.

In various embodiments, the server 612 may be adapted to run one or more services or software applications such as services and applications that provide streaming analytics. In certain embodiments, the server 612 may also provide other services or software applications can include non-virtual and virtual environments. In some embodiments, these services may be offered as web-based or cloud services or under a Software as a Service (SaaS) model to the users of the client computing devices 602, 604, 606, and/or 608. Users operating the client computing devices 602, 604, 606, and/or 608 may in turn utilize one or more client applications to interact with the server 612 to utilize the services provided by these components.

In the configuration depicted in FIG. 6, the software components 618, 620 and 622 of system 600 are shown as being implemented on the server 612. In other embodiments, one or more of the components of the system 600 and/or the services provided by these components may also be implemented by one or more of the client computing devices 602, 606, 606, and/or 608. Users operating the client computing devices may then utilize one or more client applications to use the services provided by these components. These components may be implemented in hardware, firmware, software, or combinations thereof. It should be appreciated that various different system configurations are possible, which may be different from distributed system 600. The embodiment shown in FIG. 6 is thus one example of a distributed system for implementing an embodiment system and is not intended to be limiting.

The client computing devices 602, 604, 606, and/or 608 may include various types of computing systems. For example, client device may include portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 10, Palm OS, and the like. The devices may support various applications such as various Internet-related apps, e-mail, short message service (SMS) applications, and may use various other communication protocols. The client computing devices may also include general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Client computing devices may also include electronic devices such as a thin-client computer, an Internet-enabled gaming system (e.g., a Microsoft Xbox gaming console with or without a Kinect® gesture input device), and/or a personal messaging device, capable of communicating over the network(s) 610.

Although distributed system 600 in FIG. 6 is shown with four client computing devices, any number of client computing devices may be supported. Other devices, such as devices with sensors, etc., may interact with the server 612.

The network(s) 610 in the distributed system 600 may be any type of network familiar to those skilled in the art that can support data communications using any of a variety of available protocols, including without limitation TCP/IP (transmission control protocol/Internet protocol), SNA (systems network architecture), IPX (Internet packet exchange), AppleTalk, and the like. Merely by way of example, the network(s) 610 can be a local area network (LAN), networks based on Ethernet, Token-Ring, a wide-area network, the Internet, a virtual network, a virtual private network (VPN), an intranet, an extranet, a public switched telephone network (PSTN), an infra-red network, a wireless network (e.g., a network operating under any of the Institute of Electrical and Electronics (IEEE) 1002.11 suite of protocols, Bluetooth®, and/or any other wireless protocol), and/or any combination of these and/or other networks.

The server 612 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. The server 612 can include one or more virtual machines running virtual operating systems, or other computing architectures involving virtualization. One or more flexible pools of logical storage devices can be virtualized to maintain virtual storage devices for the server. Virtual networks can be controlled by the server 612 using software defined networking. In various embodiments, the server 612 may be adapted to run one or more services or software applications described in the foregoing disclosure. For example, the server 612 may correspond to a server for performing processing as described above according to an embodiment of the present disclosure.

The server 612 may run an operating system including any of those discussed above, as well as any commercially available server operating system. Server 612 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle, Microsoft, Sybase, IBM (International Business Machines), and the like.

In some implementations, the server 612 may include one or more applications to analyze and consolidate data feeds and/or event updates received from users of the client computing devices 602, 604, 606, and 608. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. The server 612 may also include one or more applications to display the data feeds and/or real-time events via one or more display devices of the client computing devices 602, 606, 606, and 608.

The distributed system 600 may also include one or more databases 614 and 616. These databases may provide a mechanism for storing information such as event data, and other information used by embodiments of the present disclosure. Databases 614 and 616 may reside in a variety of locations. By way of example, one or more of databases 614 and 616 may reside on a non-transitory storage medium local to (and/or resident in) the server 612. Alternatively, the databases 614 and 616 may be remote from the server 612 and in communication with the server 612 via a network-based or dedicated connection. In one set of embodiments, the databases 614 and 616 may reside in a storage-area network (SAN). Similarly, any necessary files for performing the functions attributed to the server 612 may be stored locally on the server 612 and/or remotely, as appropriate. In one set of embodiments, the databases 614 and 616 may include relational databases, such as databases provided by Oracle, that are adapted to store, update, and retrieve data in response to SQL-formatted commands.

FIG. 7 illustrates an exemplary computer system 700 that may be used to implement an embodiment of the present disclosure. In some embodiments, computer system 700 may be used to implement any of the various servers and computer systems described above. As shown in FIG. 7, computer system 700 includes various subsystems including a processing subsystem 704 that communicates with a number of peripheral subsystems via a bus subsystem 702. These peripheral subsystems may include a processing acceleration unit 706, an I/O subsystem 708, a storage subsystem 718 and a communications subsystem 724. Storage subsystem 718 may include tangible computer-readable storage media 722 and a system memory 710.

Bus subsystem 702 provides a mechanism for letting the various components and subsystems of computer system 700 communicate with each other as intended. Although bus subsystem 702 is shown schematically as a single bus, alternative embodiments of the bus subsystem may utilize multiple buses. Bus subsystem 702 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard, and the like.

Processing subsystem 704 controls the operation of computer system 700 and may comprise one or more processing units 732, 734, etc. A processing unit may include be one or more processors, including single core or multicore processors, one or more cores of processors, or combinations thereof. In some embodiments, processing subsystem 704 can include one or more special purpose co-processors such as graphics processors, digital signal processors (DSPs), or the like. In some embodiments, some or all of the processing units of processing subsystem 704 can be implemented using customized circuits, such as application specific integrated circuits (ASICs), or field programmable gate arrays (FPGAs).

In some embodiments, the processing units in processing subsystem 704 can execute instructions stored in system memory 710 or on computer readable storage media 722. In various embodiments, the processing units can execute a variety of programs or code instructions and can maintain multiple concurrently executing programs or processes. At any given time, some or all of the program code to be executed can be resident in system memory 710 and/or on computer-readable storage media 710 including potentially on one or more storage devices. Through suitable programming, processing subsystem 704 can provide various functionalities described above for dynamically modifying documents (e.g., webpages) responsive to usage patterns.

In certain embodiments, a processing acceleration unit 706 may be provided for performing customized processing or for off-loading some of the processing performed by processing subsystem 704 so as to accelerate the overall processing performed by computer system 700.

I/O subsystem 708 may include devices and mechanisms for inputting information to computer system 700 and/or for outputting information from or via computer system 700. In general, use of the term "input device" is intended to include all possible types of devices and mechanisms for inputting information to computer system 700. User interface input devices may include, for example, a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may also include motion sensing and/or gesture recognition devices such as the Microsoft Kinect® motion sensor that enables users to control and interact with an input device, the Microsoft Xbox® 360 game controller, devices that provide an interface for receiving input using gestures and spoken commands. User interface input devices may also include eye gesture recognition devices such as the Google Glass® blink detector that detects eye activity (e.g., "blinking" while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

Other examples of user interface input devices include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 700 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Storage subsystem 718 provides a repository or data store for storing information that is used by computer system 700. Storage subsystem 718 provides a tangible non-transitory computer-readable storage medium for storing the basic programming and data constructs that provide the functionality of some embodiments. Software (programs, code modules, instructions) that when executed by processing subsystem 704 provide the functionality described above may be stored in storage subsystem 718. The software may be executed by one or more processing units of processing subsystem 704. Storage subsystem 718 may also provide a repository for storing data used in accordance with the present disclosure.

Storage subsystem 718 may include one or more non-transitory memory devices, including volatile and non-volatile memory devices. As shown in FIG. 7, storage subsystem 718 includes a system memory 710 and a computer-readable storage media 722. System memory 710 may include a number of memories including a volatile main random access memory (RAM) for storage of instructions and data during program execution and a non-volatile read only memory (ROM) or flash memory in which fixed instructions are stored. In some implementations, a basic input/output system (BIOS), containing the basic routines that help to transfer information between elements within computer system 700, such as during start-up, may typically be stored in the ROM. The RAM typically contains data and/or program modules that are presently being operated and executed by processing subsystem 704. In some implementations, system memory 710 may include multiple different types of memory, such as static random access memory (SRAM) or dynamic random access memory (DRAM).

By way of example, and not limitation, as depicted in FIG. 7, system memory 710 may store application programs 713, which may include client applications, Web browsers, mid-tier applications, relational database management systems (RDBMS), etc., program data 714, and an operating system 716. By way of example, operating system 716 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Computer-readable storage media 722 may store programming and data constructs that provide the functionality of some embodiments. Software (programs, code modules, instructions) that when executed by processing subsystem 704 a processor provide the functionality described above may be stored in storage subsystem 718. By way of example, computer-readable storage media 722 may include non-volatile memory such as a hard disk drive, a magnetic disk drive, an optical disk drive such as a CD ROM, DVD, a Blu-Ray® disk, or other optical media. Computer-readable storage media 722 may include, but is not limited to, Zip® drives, flash memory cards, universal serial bus (USB) flash drives, secure digital (SD) cards, DVD disks, digital video tape, and the like. Computer-readable storage media 722 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. Computer-readable media 722 may provide storage of computer-readable instructions, data structures, program modules, and other data for computer system 700.

In certain embodiments, storage subsystem 700 may also include a computer-readable storage media reader 720 that can further be connected to computer-readable storage media 722. Together and, optionally, in combination with system memory 710, computer-readable storage media 722 may comprehensively represent remote, local, fixed, and/or removable storage devices plus storage media for storing computer-readable information.

In certain embodiments, computer system 700 may provide support for executing one or more virtual machines. Computer system 700 may execute a program such as a hypervisor for facilitating the configuring and managing of the virtual machines. Each virtual machine may be allocated memory, compute (e.g., processors, cores), I/O, and networking resources. Each virtual machine typically runs its own operating system, which may be the same as or different from the operating systems executed by other virtual machines executed by computer system 700. Accordingly, multiple operating systems may potentially be run concurrently by computer system 700. Each virtual machine generally runs independently of the other virtual machines.

Communications subsystem 724 provides an interface to other computer systems and networks. Communications subsystem 724 serves as an interface for receiving data from and transmitting data to other systems from computer system 700. For example, communications subsystem 724 may enable computer system 700 to establish a communication channel to one or more client devices via the Internet for receiving and sending information from and to the client devices. Additionally, communication subsystem 724 may be used to communicate notifications of successful logins or notifications to re-enter a password from the privileged account manager to the requesting users.

Communication subsystem 724 may support both wired and/or wireless communication protocols. For example, in certain embodiments, communications subsystem 724 may include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 724 can provide wired network connectivity (e.g., Ethernet) in addition to or instead of a wireless interface.

Communication subsystem 724 can receive and transmit data in various forms. For example, in some embodiments, communications subsystem 724 may receive input communication in the form of structured and/or unstructured data feeds 726, event streams 728, event updates 730, and the like. For example, communications subsystem 724 may be configured to receive (or send) data feeds 726 in real-time from users of social media networks and/or other communication services such as Twitter® feeds, Facebook® updates, web feeds such as Rich Site Summary (RSS) feeds, and/or real-time updates from one or more third party information sources.

In certain embodiments, communications subsystem 724 may be configured to receive data in the form of continuous data streams, which may include event streams 728 of real-time events and/or event updates 730, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 724 may also be configured to output the structured and/or unstructured data feeds 726, event streams 728, event updates 730, and the like to one or more databases that may be in communication with one or more streaming data source computers coupled to computer system 700.

Computer system 700 can be one of various types, including a handheld portable device (e.g., an iPhone® cellular phone, an iPad® computing tablet, a PDA), a wearable device (e.g., a Google Glass® head mounted display), a personal computer, a workstation, a mainframe, a kiosk, a server rack, or any other data processing system.

Due to the ever-changing nature of computers and networks, the description of computer system 700 depicted in FIG. 7 is intended only as a specific example. Many other configurations having more or fewer components than the system depicted in FIG. 7 are possible. Based on the disclosure and teachings provided herein, a person of ordinary skill in the art will appreciate other ways and/or methods to implement the various embodiments.

Systems depicted in some of the figures may be provided in various configurations. In some embodiments, the systems may be configured as a distributed system where one or more components of the system are distributed across one or more networks in one or more cloud infrastructure systems.

A cloud infrastructure system is a collection of one or more server computing devices, network devices, and/or storage devices. These resources may be divided by cloud services providers and allotted to its customers in some manner. For example, a cloud services provider, such as Oracle Corporation of Redwood Shores, Calif., may offer various types of cloud services including but not limited to one or more services provided under Software as a Service (SaaS) category, services provided under Platform as a Service (PaaS) category, services provided under Infrastructure as a Service (IaaS) category, or other categories of services including hybrid services. Examples of SaaS services include, without limitation, capabilities to build and deliver a suite of on-demand applications such as Oracle Fusion applications. SaaS services enable customers to utilize applications executing on the cloud infrastructure system without the need for customers to purchase software for the applications. Examples of PaaS services include without limitation services that enable organizations (such as Oracle) to consolidate existing applications on a shared, common architecture, as well as the ability to build new applications that leverage the shared services provided by the platform such as Oracle Java Cloud Service (JCS), Oracle Database Cloud Service (DBCS), and others. IaaS services typically facilitate the management and control of the underlying computing resources, such as storage, networks, and other fundamental computing resources for customers utilizing services provided by the SaaS platform and the PaaS platform.

FIG. 8 is a simplified block diagram of one or more components of a system environment 800 by which services provided by one or more components of an embodiment system may be offered as cloud services, in accordance with an embodiment of the present disclosure. In the illustrated embodiment, system environment 800 includes one or more client computing devices 804, 806, and 808 that may be used by users to interact with a cloud infrastructure system 802 that provides cloud services. The client computing devices may be configured to operate a client application such as a web browser, a proprietary client application (e.g., Oracle Forms), or some other application, which may be used by a user of the client computing device to interact with cloud infrastructure system 802 to use services provided by cloud infrastructure system 802.

It should be appreciated that cloud infrastructure system 802 depicted in the figure may have other components than those depicted. Further, the embodiment shown in the figure is only one example of a cloud infrastructure system that may incorporate an embodiment of the disclosure. In some other embodiments, cloud infrastructure system 802 may have more or fewer components than shown in the figure, may combine two or more components, or may have a different configuration or arrangement of components.

Client computing devices 804, 806, and 808 may be devices similar to those described above for 602, 604, 606, and 608.

Although exemplary system environment 800 is shown with three client computing devices, any number of client computing devices may be supported. Other devices such as devices with sensors, etc. may interact with cloud infrastructure system 802.

Network(s) 810 may facilitate communications and exchange of data between clients 804, 806, and 808 and cloud infrastructure system 802. Each network may be any type of network familiar to those skilled in the art that can support data communications using any of a variety of commercially-available protocols, including those described above for network(s) 610.

Cloud infrastructure system 802 may comprise one or more computers and/or servers that may include those described above for server 612.

In certain embodiments, services provided by the cloud infrastructure system may include a host of services that are made available to users of the cloud infrastructure system on demand, such as online data storage and backup solutions, Web-based e-mail services, hosted office suites and document collaboration services, database processing, managed technical support services, and the like. Services provided by the cloud infrastructure system can dynamically scale to meet the needs of its users. A specific instantiation of a service provided by cloud infrastructure system is referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain embodiments, cloud infrastructure system 802 may include a suite of applications, middleware, and database service offerings that are delivered to a customer in a self-service, subscription-based, elastically scalable, reliable, highly available, and secure manner. An example of such a cloud infrastructure system is the Oracle Public Cloud provided by the present assignee.

In various embodiments, cloud infrastructure system 802 may be adapted to automatically provision, manage and track a customer's subscription to services offered by cloud infrastructure system 802. Cloud infrastructure system 802 may provide the cloud services via different deployment models. For example, services may be provided under a public cloud model in which cloud infrastructure system 802 is owned by an organization selling cloud services (e.g., owned by Oracle) and the services are made available to the general public or different industry enterprises. As another example, services may be provided under a private cloud model in which cloud infrastructure system 802 is operated solely for a single organization and may provide services for one or more entities within the organization. The cloud services may also be provided under a community cloud model in which cloud infrastructure system 802 and the services provided by cloud infrastructure system 802 are shared by several organizations in a related community. The cloud services may also be provided under a hybrid cloud model, which is a combination of two or more different models.

In some embodiments, the services provided by cloud infrastructure system 802 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 802. Cloud infrastructure system 802 then performs processing to provide the services in the customer's subscription order.

In some embodiments, the services provided by cloud infrastructure system 802 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some embodiments, platform services may be provided by the cloud infrastructure system via a PaaS platform. The PaaS platform may be configured to provide cloud services that fall under the PaaS category. Examples of platform services may include without limitation services that enable organizations (such as Oracle) to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by the cloud infrastructure system without the need for customers to purchase separate licenses and support. Examples of platform services include, without limitation, Oracle Java Cloud Service (JCS), Oracle Database Cloud Service (DBCS), and others.

By utilizing the services provided by the PaaS platform, customers can employ programming languages and tools supported by the cloud infrastructure system and also control the deployed services. In some embodiments, platform services provided by the cloud infrastructure system may include database cloud services, middleware cloud services (e.g., Oracle Fusion Middleware services), and Java cloud services. In one embodiment, database cloud services may support shared service deployment models that enable organizations to pool database resources and offer customers a Database as a Service in the form of a database cloud. Middleware cloud services may provide a platform for customers to develop and deploy various business applications, and Java cloud services may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain embodiments, cloud infrastructure system 802 may also include infrastructure resources 830 for providing the resources used to provide various services to customers of the cloud infrastructure system. In one embodiment, infrastructure resources 830 may include pre-integrated and optimized combinations of hardware, such as servers, storage, and networking resources to execute the services provided by the PaaS platform and the SaaS platform.

In some embodiments, resources in cloud infrastructure system 802 may be shared by multiple users and dynamically re-allocated per demand. Additionally, resources may be allocated to users in different time zones. For example, cloud infrastructure system 830 may enable a first set of users in a first time zone to utilize resources of the cloud infrastructure system for a specified number of hours and then enable the re-allocation of the same resources to another set of users located in a different time zone, thereby maximizing the utilization of resources.

In certain embodiments, a number of internal shared services 832 may be provided that are shared by different components or modules of cloud infrastructure system 802 and by the services provided by cloud infrastructure system 802. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain embodiments, cloud infrastructure system 802 may provide comprehensive management of cloud services (e.g., SaaS, PaaS, and IaaS services) in the cloud infrastructure system. In one embodiment, cloud management functionality may include capabilities for provisioning, managing and tracking a customer's subscription received by cloud infrastructure system 802, and the like.

In one embodiment, as depicted in the figure, cloud management functionality may be provided by one or more modules, such as an order management module 820, an order orchestration module 822, an order provisioning module 824, an order management and monitoring module 826, and an identity management module 828. These modules may include or be provided using one or more computers and/or servers, which may be general purpose computers, specialized server computers, server farms, server clusters, or any other appropriate arrangement and/or combination.

In exemplary operation 834, a customer using a client device, such as client device 804, 806 or 808, may interact with cloud infrastructure system 802 by requesting one or more services provided by cloud infrastructure system 802 and placing an order for a subscription for one or more services offered by cloud infrastructure system 802. In certain embodiments, the customer may access a cloud User Interface (UI), cloud UI 812, cloud UI 814 and/or cloud UI 816 and place a subscription order via these UIs. The order information received by cloud infrastructure system 802 in response to the customer placing an order may include information identifying the customer and one or more services offered by the cloud infrastructure system 802 that the customer intends to subscribe to.

After an order has been placed by the customer, the order information is received via the cloud UIs, 812, 814 and/or 816.

At operation 836, the order is stored in order database 818. Order database 818 can be one of several databases operated by cloud infrastructure system 818 and operated in conjunction with other system elements.

At operation 838, the order information is forwarded to an order management module 820. In some instances, order management module 820 may be configured to perform billing and accounting functions related to the order, such as verifying the order, and upon verification, booking the order.

At operation 840, information regarding the order is communicated to an order orchestration module 822. Order orchestration module 822 may utilize the order information to orchestrate the provisioning of services and resources for the order placed by the customer. In some instances, order orchestration module 822 may orchestrate the provisioning of resources to support the subscribed services using the services of order provisioning module 824.

In certain embodiments, order orchestration module 822 enables the management of business processes associated with each order and applies business logic to determine whether an order should proceed to provisioning. At operation 842, upon receiving an order for a new subscription, order orchestration module 822 sends a request to order provisioning module 824 to allocate resources and configure those resources needed to fulfill the subscription order. Order provisioning module 824 enables the allocation of resources for the services ordered by the customer. Order provisioning module 824 provides a level of abstraction between the cloud services provided by cloud infrastructure system 800 and the physical implementation layer that is used to provision the resources for providing the requested services. Order orchestration module 822 may thus be isolated from implementation details, such as whether or not services and resources are actually provisioned on the fly or pre-provisioned and only allocated/assigned upon request.

At operation 844, once the services and resources are provisioned, a notification of the provided service may be sent to customers on client devices 804, 806 and/or 808 by order provisioning module 824 of cloud infrastructure system 802. At operation 846, the customer's subscription order may be managed and tracked by an order management and monitoring module 826. In some instances, order management and monitoring module 826 may be configured to collect usage statistics for the services in the subscription order, such as the amount of storage used, the amount data transferred, the number of users, and the amount of system up time and system down time.

In certain embodiments, cloud infrastructure system 800 may include an identity management module 828. Identity management module 828 may be configured to provide identity services, such as access management and authorization services in cloud infrastructure system 800. In some embodiments, identity management module 828 may control information about customers who wish to utilize the services provided by cloud infrastructure system 802. Such information can include information that authenticates the identities of such customers and information that describes which actions those customers are authorized to perform relative to various system resources (e.g., files, directories, applications, communication ports, memory segments, etc.) Identity management module 828 may also include the management of descriptive information about each customer and about how and by whom that descriptive information can be accessed and modified.

Although specific embodiments of the disclosure have been described, various modifications, alterations, alternative constructions, and equivalents are also encompassed within the scope of the disclosure. Embodiments of the present disclosure are not restricted to operation within certain specific data processing environments, but are free to operate within a plurality of data processing environments. Additionally, although embodiments of the present disclosure have been described using a particular series of transactions and steps, it should be apparent to those skilled in the art that the scope of the present disclosure is not limited to the described series of transactions and steps. Various features and aspects of the above-described embodiments may be used individually or jointly.

Further, while embodiments of the present disclosure have been described using a particular combination of hardware and software, it should be recognized that other combinations of hardware and software are also within the scope of the present disclosure. Embodiments of the present disclosure may be implemented only in hardware, or only in software, or using combinations thereof. The various processes described herein can be implemented on the same processor or different processors in any combination. Accordingly, where components or modules are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for inter process communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific disclosure embodiments have been described, these are not intended to be limiting. Various modifications and equivalents are within the scope of the following claims.

What is claimed is:

1. A method, comprising:
   receiving, at a batch layer of an event processing network from a first data source, a first data stream including a batch of historical events for a plurality of potential targets, wherein the first data source is an entity or an application, wherein each historical event within the batch of historical events comprises, for each potential target, a unique identifier, geolocation data, and temporal data, and wherein the first data stream is non-continuous and provides the batch of historical events at periodic times;
   executing, by a first event processing application of the batch layer, a first continuous query using a continuous query language processor comprising logic for obtaining, for each potential target, information comprising the unique identifier, the geolocation data, and the temporal data, from the batch of historical events;
   determining, by the first event processing application, an instance of one or more polygons that is associated with each potential target based on the geolocation data and the temporal data for each potential target, wherein the one or more polygons are part of a grid of polygons that is overlaid on a geographic map and defines an artificial boundary for a plurality of geographic areas within the geographic map, and wherein each instance of each of the one or more polygons is associated with one time period among a plurality of different time periods designated for each of the one or more polygons;
   associating, by the first event processing application, the unique identifier and the temporal data for each potential target with the instance of the one or more polygons;
   determining, by the first event processing application, an approximate target viewership for each instance of each of the one or more polygons, respectively, based on a profile or a taxonomy of each potential target associated with each instance of each of the one or more polygons, thereby establishing a collective voice of the plurality of potential targets for each instance of each of the one or more polygons;
   associating, by the first event processing application, a message with each instance of the one or more polygons based on the approximate target viewership;
   storing, by the first event processing application, the instance of the one or more polygons and associated message in a memory storage device;
   receiving, at a stream layer of the event processing network from a second data source different from the first data source, a second data stream including a plurality of events as a continuous stream of events, wherein the second data source is a dynamic asset having a physical position that is moving in a physical world such that geolocation data for the dynamic asset changes over time, the dynamic asset comprising a GPS sensor that senses the physical position of the dynamic asset and provides the geolocation data corresponding to the physical position, wherein each event within the continuous stream of events is real-time data for the dynamic asset, wherein the continuous stream of events has a schema comprising: (i) temporal data of the dynamic asset, and (ii) attributes including an identifier for the dynamic asset and the geolocation data of the dynamic asset;
   executing, by a second event processing application of the stream layer, a second continuous query on the continuous stream of events using the continuous query language processor to obtain, in real time, the temporal data and the geolocation data for the dynamic asset that are included in the continuous stream of events and respectively correspond to each of the plurality of events, the plurality of events comprising a first event corresponding to the physical position of the dynamic asset at a current time;
   executing, by the second event processing application, a query on the memory storage device using information of the first event, to identify a message of interest, by comparing the geolocation data of the physical position of the dynamic asset at the current time and the stored geolocation data of the one or more polygons, determining, based on the comparing, a first polygon within the grid of polygons that corresponds to a geographic area where the dynamic asset is presently located among the plurality of geographic areas, determining an instance of the first polygon that is associated with one of the plurality of different time periods that matches the current time, and identifying the message associated with the instance as the message of interest; and
   providing, by the second event processing application to an event sink, the message of interest, wherein the providing causes the message of interest to be displayed on the dynamic asset whose geolocation data corresponds to the geographic area that corresponds to the first polygon and where the dynamic asset is presently located,
   wherein the message of interest corresponds to the collective voice for the geographic area corresponding to the first polygon and the one of the plurality of different time periods that matches the current time.

2. The method of claim 1, wherein the determining the approximate target viewership comprises:
   identifying, by the first event processing application, all potential targets associated with each instance of the one or more polygons including the potential target;
   analyzing, by the first event processing application, the profile or taxonomy for each of the potential targets to determine different groups of potential targets within each instance of the one or more polygons; and
   performing statistical analysis, by the first event processing application, on the different groups of potential targets to determine a predominant or amalgamate profile or taxonomy for the approximate target viewership.

3. The method of claim 2, further comprising:
   obtaining, by the first event processing application, the profile or taxonomy data for the potential target from a third party source; and
   obtaining, by the first event processing application, a plurality of messages from the third party source, wherein each of the plurality of messages comprises profile or taxonomy data, wherein the associating the message with each instance of the one or more polygons comprises:
matching the predominant or amalgamate profile or taxonomy for the approximate target viewership with profile or taxonomy data of one or more of the plurality of messages; and
associating each of the one or more of the plurality of messages with each instance of the one or more polygons based on the matching.

4. The method of claim 3, wherein:
the executing the query on the memory storage device comprises obtaining, by the second event processing application, each of the one or more of the plurality of messages associated with each instance of the one or more polygons; and
the message to be provided to the event sink is selected from the one or more of the plurality of messages based on one or more business rules.

5. A system comprising:
an event processing network comprising one or more processors and non-transitory machine readable storage medium having instructions stored thereon that, when executed by the one or more processors, cause the one or more processors to perform a process including:
receiving, at a batch layer of the event processing network from a first data source, a first data stream including a batch of historical events for a plurality of potential targets, wherein the first data source is an entity or an application, wherein each historical event within the batch of historical events comprises, for each potential target, a unique identifier, geolocation data, and temporal data, and wherein the first data stream is non-continuous and provides the batch of historical events at periodic times;
executing, by a first event processing application of the batch layer, a first continuous query using a continuous query language processor comprising logic for obtaining, for each potential target, information comprising the unique identifier, the geolocation data, and the temporal data, from the batch of historical events;
determining, by the first event processing application, an instance of one or more polygons that is associated with each potential target based on the geolocation data and the temporal data for each potential target, wherein the one or more polygons are part of a grid of polygons that is overlaid on a geographic map and defines an artificial boundary for a plurality of geographic areas within the geographic map, and wherein each instance of each of the one or more polygons is associated with one time period among a plurality of different time periods designated for each of the one or more polygons;
associating, by the first event processing application, the unique identifier and the temporal data for each potential target with the instance of the one or more polygons;
determining, by the first event processing application, an approximate target viewership for each instance of each of the one or more polygons, respectively, based on a profile or a taxonomy of each potential target associated with each instance of each of the one or more polygons, thereby establishing a collective voice of the plurality of potential targets for each instance of each of the one or more polygons;
associating, by the first event processing application, a message with each instance of the one or more polygons based on the approximate target viewership;
storing, by the first event processing application, the instance of the one or more polygons and associated message in a memory storage device;
receiving, at a stream layer of the event processing network from a second data source different from the first data source, a second data stream including a plurality of events as a continuous stream of events, wherein the second data source is a dynamic asset having a physical position that is moving in a physical world such that geolocation data for the dynamic asset changes over time, the dynamic asset comprising a GPS sensor that senses the physical position of the dynamic asset and provides the geolocation data corresponding to the physical position, wherein each event within the continuous stream of events is real-time data for the dynamic asset, wherein the continuous stream of events has a schema comprising (i) temporal data of the dynamic asset, and (ii) attributes including an identifier for the dynamic asset and the geolocation data of the dynamic asset;
executing, by a second event processing application of the stream layer, a second continuous query on the continuous stream of events using the continuous query language processor to obtain, in real time, the temporal data and the geolocation data for the dynamic asset that are included in the continuous stream of events and respectively correspond to each of the plurality of events, the plurality of events comprising a first event corresponding to the physical position of the dynamic asset at a current time;
executing, by the second event processing application, a query on the memory storage device using information of the first event, to identify a message of interest, by comparing the geolocation data of the physical position of the dynamic asset at the current time and the stored geolocation data of the one or more polygons, determining, based on the comparing, a first polygon within the grid of polygons that corresponds to a geographic area where the dynamic asset is presently located among the plurality of geographic areas, determining an instance of the first polygon that is associated with one of the plurality of different time periods that matches the current time, and identifying the message associated with the instance as the message of interest; and
providing, by the second event processing application to an event sink, the message of interest, wherein the providing causes the message of interest to be displayed on the dynamic asset whose geolocation data corresponds to the geographic area that corresponds to the first polygon and where the dynamic asset is presently located,
wherein the message of interest corresponds to the collective voice for the geographic area corresponding to the first polygon and the one of the plurality of different time periods that matches the current time.

6. The system of claim 5, wherein the potential target is a potential customer of a product or a service to be displayed in the message associated with the one or more polygons.

7. The system of claim 6, wherein the determining the approximate target viewership includes:

identifying, by the first event processing application, all potential targets associated with each instance of the one or more polygons including the potential target;

analyzing, by the first event processing application, the profile or taxonomy for each of the potential targets to determine different groups of potential targets within each instance of the one or more polygons; and performing statistical analysis, by the first event processing application, on the different groups of potential targets to determine a predominant or amalgamate profile or taxonomy for the approximate target viewership.

8. The system of claim 7, wherein the process further includes:

obtaining, by the first event processing application, the profile or taxonomy data for the potential target from a third party source; and obtaining, by the first event processing application, a plurality of messages from the third party source, wherein each of the plurality of messages comprises profile or taxonomy data, wherein the associating the message with each instance of the one or more polygons includes:

matching the predominant or amalgamate profile or taxonomy for the approximate target viewership with profile or taxonomy data of one or more of the plurality of messages; and associating each of the one or more of the plurality of messages with each instance of each of the one or more polygons based on the matching.

9. The system of claim 8, wherein:

the executing the query on the memory storage device includes obtaining, by the second event processing application, each of the one or more of the plurality of messages associated with each instance of the one or more polygons; and the message to be provided to the event sink is selected from the one or more of the plurality of messages based on one or more business rules.

10. A non-transitory machine readable storage medium having instructions stored thereon that, when executed by one or more processors, cause the one or more processors to perform a method including:

receiving, at a batch layer of an event processing network from a first data source, a first data stream including a batch of historical events for a plurality of potential targets, wherein the first data source is an entity or an application, wherein each historical event within the batch of historical events comprises, for each potential target, a unique identifier, geolocation data, and temporal data, and wherein the first data stream is non-continuous and provides the batch of historical events at periodic times;

executing, by a first event processing application of the batch layer, a first continuous query using a continuous query language processor comprising logic for obtaining, for each potential target, information comprising the unique identifier, the geolocation data, and the temporal data, from the batch of historical events;

determining, by the first event processing application, an instance of one or more polygons that is associated with each potential target based on the geolocation data and the temporal data for each potential target, wherein the one or more polygons are part of a grid of polygons that is overlaid on a geographic map and defines an artificial boundary for a plurality of geographic areas within the geographic map, and wherein each instance of each of the one or more polygons is associated with one time period among a plurality of different time periods designated for each of the one or more polygons;

associating, by the first event processing application, the unique identifier and the temporal data for each potential target with the instance of the one or more polygons;

determining, by the first event processing application, an approximate target viewership for each instance of each of the one or more polygons, respectively, based on a profile or a taxonomy of each potential target associated with each instance of each of the one or more polygons, thereby establishing a collective voice of the plurality of potential targets for each instance of each of the one or more polygons;

associating, by the first event processing application, a message with each instance of the one or more polygons based on the approximate target viewership;

storing, by the first event processing application, the instance of the one or more polygons and associated message in a memory storage device;

receiving, at a stream layer of the event processing network from a second data source different from the first data source, a second data stream including a plurality of events as a continuous stream of events, wherein the second data source is a dynamic asset having a physical position that is moving in a physical world such that geolocation data for the dynamic asset changes over time, the dynamic asset comprising a GPS sensor that senses the physical position of the dynamic asset and provides the geolocation data corresponding to the physical position, wherein each event within the continuous stream of events is real-time data for the dynamic asset, wherein the continuous stream of events has a schema comprising: (i) temporal data of the dynamic asset, and (ii) attributes including an identifier for the dynamic asset and the geolocation data of the dynamic asset;

executing, by a second event processing application of the stream layer, a second continuous query on the continuous stream of events using the continuous query language processor to obtain, in real time, the temporal data and the geolocation data for the dynamic asset that are included in the continuous stream of events and respectively correspond to each of the plurality of events, the plurality of events comprising a first event corresponding to the physical position of the dynamic asset at a current time;

executing, by the second event processing application, a query on the memory storage device using information of the first event, to identify a message of interest, by comparing the geolocation data of the physical position of the dynamic asset at the current time and the stored geolocation data of the one or more polygons, determining, based on the comparing, a first polygon within the grid of polygons that corresponds to a geographic area where the dynamic asset is presently located among the plurality of geographic areas, determining an instance of the first polygon that is associated with one of the plurality of different time periods that matches the current time, and identifying the message associated with the instance as the message of interest; and providing, by the second event processing application to an event sink, the message of interest, wherein the providing causes the message of interest to be displayed on the dynamic asset whose geolocation data corresponds to the geographic area that corresponds to the first polygon and where the dynamic asset is presently located, wherein the message of interest corresponds to the collective voice for the geographic area corresponding to the first polygon and the one of the plurality of different time periods that matches the current time.

11. The non-transitory machine readable storage medium of claim 10, wherein the potential target is a potential customer of a product or service to be displayed in the message associated with the one or more polygons.

12. The non-transitory machine readable storage medium of claim 11, wherein the determining the approximate target viewership includes:

identifying, by the first event processing application, all potential targets associated with each instance of the one or more polygons including the potential target;

analyzing, by the first event processing application, the profile or taxonomy for each of the potential targets to determine different groups of potential targets within each instance of the one or more polygons; and performing statistical analysis, by the first event processing application, on the different groups of potential targets to determine a predominant or amalgamate profile or taxonomy for the approximate target viewership.

13. The non-transitory machine readable storage medium of claim 12, wherein the method further includes:

obtaining, by the first event processing application, the profile or taxonomy data for the potential target from a third party source; and obtaining, by the first event processing application, a plurality of messages from the third party source, wherein each of the plurality of messages comprises profile or taxonomy data, wherein the associating the message with each instance of the one or more polygons includes:

matching the predominant or amalgamate profile or taxonomy for the approximate target viewership with profile or taxonomy data of one or more of the plurality of messages; and associating each of the one or more of the plurality of messages with each instance of the one or more polygons based on the matching.

14. The non-transitory machine readable storage medium of claim 13, wherein:

the executing the query on the memory storage device includes obtaining, by the second event processing application, each of the one or more of the plurality of messages associated with each instance of the one or more polygons; and the message of interest to be provided to the event sink is selected from the one or more of the plurality of messages based on one or more business rules.

* * * * *

UNITED STATES PATENT AND TRADEMARK OFFICE
CERTIFICATE OF CORRECTION

| | | |
|---|---|---|
| PATENT NO. | : 11,657,425 B2 | Page 1 of 1 |
| APPLICATION NO. | : 16/022005 | |
| DATED | : May 23, 2023 | |
| INVENTOR(S) | : Park et al. | |

It is certified that error appears in the above-identified patent and that said Letters Patent is hereby corrected as shown below:

In the Drawings

On sheet 5 of 9, in FIG. 4, Line 18, delete "Yound" and insert -- Young --, therefor.

In the Specification

In Column 11, Line 50, delete "(HA)" and insert -- (HA)) --, therefor.

In Column 15, Line 23, delete "applications" and insert -- applications. --, therefor.

In Column 30, Line 21, delete "Internet" and insert -- Internetwork --, therefor.

In Column 34, Line 55, delete "evolution)," and insert -- evolution)), --, therefor.

In the Claims

In Column 44, Lines 22-23, in Claim 5, delete "comprising" and insert -- comprising: --, therefor.

Signed and Sealed this
Twenty-seventh Day of February, 2024

Katherine Kelly Vidal
*Director of the United States Patent and Trademark Office*